United States Patent
Riley et al.

(10) Patent No.: US 9,217,363 B2
(45) Date of Patent: Dec. 22, 2015

(54) SUPER-TURBOCHARGER HAVING A HIGH SPEED TRACTION DRIVE AND A CONTINUOUSLY VARIABLE TRANSMISSION

(71) Applicant: VANDYNE SUPERTURBO, INC., Loveland, CO (US)

(72) Inventors: Michael B. Riley, Fort Collins, CO (US); Ed VanDyne, Loveland, CO (US); Jared William Brown, Fort Collins, CO (US)

(73) Assignee: VanDyne SuperTurbo, Inc., Loveland, CO (US)

( * ) Notice: Subject to any disclaimer, the term of this patent is extended or adjusted under 35 U.S.C. 154(b) by 0 days.

(21) Appl. No.: 14/055,213

(22) Filed: Oct. 16, 2013

(65) Prior Publication Data

US 2014/0174076 A1   Jun. 26, 2014

Related U.S. Application Data

(60) Division of application No. 12/701,440, filed on Feb. 5, 2010, now Pat. No. 8,561,403, which is a continuation-in-part of application No. 12/536,421, filed on Aug. 5, 2009, now abandoned.

(60) Provisional application No. 61/086,401, filed on Aug. 5, 2008.

(51) Int. Cl.
*F02B 33/44* (2006.01)
*F02B 37/10* (2006.01)
(Continued)

(52) U.S. Cl.
CPC ............... *F02B 37/105* (2013.01); *F02B 39/04* (2013.01); *F02B 41/10* (2013.01);
(Continued)

(58) Field of Classification Search
CPC ....... Y02T 10/18; F02B 37/183; F02B 37/025; F02B 37/02; F02B 37/004; F02B 37/013; F02B 29/04
USPC .................. 60/600, 602, 605.2, 612; 123/562
See application file for complete search history.

(56) References Cited

U.S. PATENT DOCUMENTS

| 236,150 A | 1/1881 | Fitch |
|---|---|---|
| 1,526,493 A | 2/1925 | Dolton |

(Continued)

FOREIGN PATENT DOCUMENTS

| EP | 0517675 | 8/1995 |
|---|---|---|
| EP | 1400667 | 3/2004 |

(Continued)

OTHER PUBLICATIONS

PCT Application Serial No. PCT/US09/51742, filed with the U.S. Receiving Office on Jul. 24, 2009.

(Continued)

*Primary Examiner* — Thomas Denion
*Assistant Examiner* — Patrick Maines
(74) *Attorney, Agent, or Firm* — William W. Cochran; Cochran Freund & Young LLC

(57) ABSTRACT

A super-turbocharger utilizing a high speed, fixed ratio traction drive that is coupled to a continuously variable transmission to allow for high speed operation is provided. A high speed traction drive is utilized to provide speed reduction from the high speed turbine shaft. A second traction drive provides infinitely variable speed ratios through a continuously variable transmission. Gas recirculation in a super-turbocharger is also disclosed.

17 Claims, 23 Drawing Sheets

(51) Int. Cl.
  *F02B 39/04* (2006.01)
  *F02B 41/10* (2006.01)
  *F02M 25/07* (2006.01)
  *F16H 9/16* (2006.01)
  *F16H 13/06* (2006.01)
  *F16H 15/04* (2006.01)
  *F16H 15/50* (2006.01)

(52) U.S. Cl.
  CPC ...... *F02M 25/0704* (2013.01); *F02M 25/0779* (2013.01); *F16H 9/16* (2013.01); *F16H 13/06* (2013.01); *F16H 15/04* (2013.01); *F16H 15/50* (2013.01); *F16H 15/503* (2013.01); *Y02T 10/144* (2013.01); *Y02T 10/163* (2013.01)

(56) References Cited

U.S. PATENT DOCUMENTS

| | | | |
|---|---|---|---|
| 1,550,796 | A | 8/1925 | Gammons |
| 1,686,446 | A | 10/1928 | Gilman |
| 1,691,625 | A | 11/1928 | Chilton |
| 1,718,846 | A | 6/1929 | Arter |
| 1,979,170 | A | 10/1934 | Nardone |
| 2,076,057 | A | 4/1937 | Almen |
| 2,173,595 | A | 9/1939 | Schutte |
| 2,216,494 | A | 10/1940 | Kurtz et al. |
| 2,278,181 | A | 3/1942 | Lieberherr |
| 2,397,941 | A | 4/1946 | Birkigt |
| 2,412,351 | A | 12/1946 | Mount |
| 2,542,539 | A | 2/1951 | Kuhrt et al. |
| 2,573,258 | A | 10/1951 | Gerritsen |
| 2,585,029 | A | 2/1952 | Nettel |
| 2,585,698 | A | 2/1952 | Schneider |
| 2,585,968 | A | 2/1952 | Schneider |
| 2,585,986 | A | 2/1952 | Andreasson |
| 2,586,725 | A | 2/1952 | Schottler |
| 2,590,800 | A | 3/1952 | Stephenson |
| 2,620,621 | A | 12/1952 | Neftel |
| 2,652,006 | A | 9/1953 | Simonson |
| 2,696,888 | A | 12/1954 | Chillson et al. |
| 2,701,970 | A | 2/1955 | Kraus |
| 2,803,507 | A | 8/1957 | Mempel et al. |
| 2,874,592 | A | 2/1959 | Oehrli |
| 2,878,692 | A | 3/1959 | Wolf |
| 2,901,924 | A | 9/1959 | Banker |
| 2,905,026 | A | 9/1959 | Oehrli |
| 2,913,932 | A | 11/1959 | Oehrli |
| 2,941,422 | A | 6/1960 | Barish |
| 2,973,671 | A | 3/1961 | Elkins |
| 3,035,460 | A | 5/1962 | Guichard |
| 3,044,683 | A | 7/1962 | Woollenweber |
| 3,163,984 | A | 1/1965 | Dumont |
| 3,203,278 | A | 8/1965 | General |
| 3,237,468 | A | 3/1966 | Schottler |
| 3,246,531 | A | 4/1966 | Kashihara |
| 3,248,960 | A | 5/1966 | Schottler |
| 3,254,546 | A | 6/1966 | Nasvytis |
| 3,293,945 | A | 12/1966 | Stockton |
| 3,420,122 | A | 1/1969 | Okabe |
| 3,423,927 | A | 1/1969 | Scherenberg |
| 3,494,224 | A | 2/1970 | Fellows et al. |
| 3,504,574 | A | 4/1970 | Okabe |
| 3,673,797 | A | 7/1972 | Wilkinson |
| 3,676,999 | A | 7/1972 | Oldfield |
| 3,707,888 | A | 1/1973 | Schottler |
| 3,745,844 | A | 7/1973 | Schottler |
| 3,793,907 | A | 2/1974 | Nakamura et al. |
| 3,988,894 | A | 11/1976 | Melchior |
| 4,052,915 | A | 10/1977 | Kraus |
| 4,089,569 | A | 5/1978 | Rempel |
| 4,215,549 | A | 8/1980 | Daeschner |
| 4,270,400 | A | 6/1981 | Fodor |
| 4,287,791 | A | 9/1981 | Numazawa et al. |
| 4,312,183 | A | 1/1982 | Regar |
| 4,314,485 | A | 2/1982 | Adams |
| 4,345,486 | A | 8/1982 | Olesen |
| 4,378,677 | A | 4/1983 | Zumstein |
| 4,398,436 | A | 8/1983 | Fisher |
| 4,424,726 | A | 1/1984 | Galbraith |
| 4,445,337 | A | 5/1984 | McCreary |
| 4,449,370 | A | 5/1984 | Ream |
| 4,452,043 | A | 6/1984 | Wallace |
| 4,489,992 | A | 12/1984 | Brandenstein et al. |
| 4,570,501 | A | 2/1986 | de Bris Perry |
| 4,592,247 | A | 6/1986 | Mutschler |
| 4,593,574 | A | 6/1986 | Sinn et al. |
| 4,616,481 | A | 10/1986 | Melchior et al. |
| 4,667,525 | A | 5/1987 | Schottler |
| 4,693,134 | A | 9/1987 | Kraus |
| 4,700,542 | A | 10/1987 | Wang |
| 4,718,781 | A | 1/1988 | Gerard |
| 4,729,225 | A | 3/1988 | Bucher |
| 4,856,374 | A | 8/1989 | Kreuzer |
| 4,875,454 | A | 10/1989 | Okimoto et al. |
| 4,878,467 | A | 11/1989 | Schmidt |
| 4,982,567 | A * | 1/1991 | Hashimoto et al. ............. 60/600 |
| 5,033,269 | A | 7/1991 | Smith |
| 5,037,361 | A | 8/1991 | Takahashi |
| 5,385,514 | A | 1/1995 | Dawe |
| 5,397,279 | A | 3/1995 | McCotter, Jr. |
| 5,458,855 | A | 10/1995 | Gillbrand |
| 5,551,929 | A | 9/1996 | Fritsch |
| 5,560,207 | A | 10/1996 | Ramsden et al. |
| 5,586,540 | A | 12/1996 | Marzec et al. |
| 5,713,204 | A | 2/1998 | Kadlicko |
| 5,724,813 | A | 3/1998 | Fenelon et al. |
| 5,729,978 | A | 3/1998 | Hiereth et al. |
| 5,775,417 | A | 7/1998 | Council |
| 5,782,433 | A | 7/1998 | Goi et al. |
| 5,887,434 | A | 3/1999 | Arnell et al. |
| 5,974,792 | A | 11/1999 | Isobe |
| 6,041,602 | A | 3/2000 | Dickey |
| 6,050,094 | A | 4/2000 | Udd et al. |
| 6,050,095 | A | 4/2000 | Blake |
| 6,095,940 | A | 8/2000 | Ai et al. |
| 6,145,313 | A | 11/2000 | Arnold |
| 6,227,180 | B1 | 5/2001 | Hoffmann et al. |
| 6,343,473 | B1 | 2/2002 | Kanesaka |
| 6,406,399 | B1 | 6/2002 | Ai |
| 6,408,626 | B1 | 6/2002 | Arnell |
| 6,470,864 | B2 | 10/2002 | Kim et al. |
| 6,601,388 | B1 | 8/2003 | Gladden |
| 6,651,432 | B1 | 11/2003 | Gray, Jr. |
| 6,681,574 | B2 | 1/2004 | Berglund et al. |
| 6,725,653 | B2 | 4/2004 | Brown et al. |
| 6,729,315 | B2 | 5/2004 | Onodera et al. |
| 6,857,263 | B2 | 2/2005 | Gray, Jr. et al. |
| 6,871,498 | B1 | 3/2005 | Allen et al. |
| 6,912,852 | B2 | 7/2005 | Gottemoller et al. |
| 6,960,147 | B2 | 11/2005 | Kolstrup |
| 6,994,531 | B2 | 2/2006 | Dairokuno et al. |
| 7,025,042 | B2 | 4/2006 | Gray, Jr. |
| 7,032,382 | B2 | 4/2006 | Onodera et al. |
| 7,055,507 | B2 | 6/2006 | Kelley, Jr. |
| 7,237,532 | B2 | 7/2007 | Gray, Jr. |
| 7,455,617 | B2 | 11/2008 | Miller et al. |
| 7,491,149 | B2 | 2/2009 | Greenwood et al. |
| 7,492,594 | B2 | 2/2009 | Pal |
| 7,540,818 | B2 | 6/2009 | Miller et al. |
| 2003/0089348 | A1 | 5/2003 | Janson |
| 2003/0110772 | A1 | 6/2003 | Berglund |
| 2003/0188533 | A1 | 10/2003 | Jaster |
| 2003/0196436 | A1 | 10/2003 | Hoecker et al. |
| 2004/0177606 | A1 | 9/2004 | Scharsack |
| 2005/0074341 | A1 | 4/2005 | Dairokuno et al. |
| 2005/0277514 | A1 | 12/2005 | Hiroyuki et al. |
| 2006/0032225 | A1 | 2/2006 | VanDyne |
| 2006/0070382 | A1 | 4/2006 | Karlsson |
| 2006/0157291 | A1 | 7/2006 | Puiu et al. |
| 2007/0062189 | A1 | 3/2007 | Keppeler et al. |
| 2007/0119168 | A1 * | 5/2007 | Turner ............. 60/600 |
| 2007/0130094 | A1 | 6/2007 | Lien et al. |
| 2007/0130946 | A1 | 6/2007 | Winsor et al. |
| 2007/0130948 | A1 | 6/2007 | Boehm et al. |

(56) References Cited

U.S. PATENT DOCUMENTS

| | | |
|---|---|---|
| 2007/0197337 A1 | 8/2007 | Miller et al. |
| 2007/0275809 A1 | 11/2007 | Miller et al. |
| 2008/0141810 A1 | 6/2008 | Miller et al. |
| 2008/0236150 A1 | 10/2008 | Jarvi |
| 2008/0276756 A1 | 11/2008 | Marumoto |
| 2008/0282699 A1 | 11/2008 | Barthelet et al. |
| 2009/0265080 A1 * | 10/2009 | Fry et al. ............. 701/103 |
| 2009/0277431 A1 | 11/2009 | Nitzke et al. |
| 2010/0031935 A1 | 2/2010 | VanDyne et al. |
| 2010/0174456 A1 | 7/2010 | Beaudoin et al. |
| 2010/0236503 A1 | 9/2010 | Bernt et al. |
| 2012/0003075 A1 * | 1/2012 | Niwa et al. ............. 415/111 |
| 2012/0102947 A1 * | 5/2012 | Robel ............. 60/615 |
| 2012/0192559 A1 * | 8/2012 | Laimboeck et al. ......... 60/605.1 |

FOREIGN PATENT DOCUMENTS

| | | | |
|---|---|---|---|
| EP | 01300946 | 12/2004 | |
| EP | 0994245 | 6/2005 | |
| EP | 1550796 | 7/2005 | |
| EP | 1711699 | 3/2007 | |
| FR | 2835882 A1 * | 8/2003 | ............. F02D 13/02 |
| FR | 2860834 A1 * | 4/2005 | ............. F02B 37/18 |
| GB | 0206845 | 2/1924 | |
| GB | 557970 | 12/1943 | |
| JP | 60224939 | 11/1985 | |
| JP | 61164039 | 7/1986 | |
| JP | 61250344 A * | 11/1986 | ............. F02B 37/12 |
| JP | 62020631 A * | 1/1987 | ............. F02B 37/00 |
| JP | 63088318 | 4/1988 | |
| JP | 3153947 | 7/1991 | |
| JP | 06280586 A * | 10/1994 | ............. F02B 37/00 |
| JP | 2010133296 | 6/2010 | |
| JP | 2011038450 A * | 2/2011 | |
| WO | 2004072449 | 8/2004 | |
| WO | 2006022635 | 3/2006 | |
| WO | 2008008379 | 1/2008 | |
| WO | 2011120520 | 10/2011 | |

OTHER PUBLICATIONS

U.S. Appl. No. 12/536,421, filed Aug. 5, 2009.
Provisional U.S. Appl. No. 61/086,401, filed Aug. 5, 2008.
Provisional U.S. Appl. No. 61/231,624, filed Aug. 5, 2009.
Provisional U.S. Appl. No. 61/231,628, filed Aug. 5, 2009.
International Search Report mailed Apr. 4, 2011, in PCT Application Serial No. PCT/US11/22298.

* cited by examiner

SUPER-TURBOCHARGER HAVING A HIGH SPEED TRACTION DRIVE AND A CONTINUOUSLY VARIABLE TRANSMISSION

CROSS-REFERENCE TO RELATED APPLICATION

This patent application is a divisional of U.S. application Ser. No. 12/701,440, filed Feb. 5, 2010, which application is a continuation-in-part of U.S. application Ser. No. 12/536,421, filed Aug. 5, 2009, which application claims the benefit of U.S. Provisional Patent Application Ser. No. 61/086,401, filed Aug. 5, 2008, the entire teachings and disclosure of which are incorporated by reference thereto.

BACKGROUND

Conventional turbochargers are driven by waste exhaust heat and gases, which are forced through an exhaust turbine housing onto a turbine wheel. The turbine wheel is connected by a common turbo-shaft to a compressor wheel. As the exhaust gases hit the turbine wheel, both wheels simultaneously rotate. Rotation of the compressor wheel draws air in through a compressor housing, which forces compressed air into the engine cylinder to achieve improved engine performance and fuel efficiency. Turbochargers for variable speed/load applications are typically sized for maximum efficiency at torque peak speed in order to develop sufficient boost to reach peak torque. However, at lower speeds, the turbocharger produces inadequate boost for proper engine transient response.

To overcome these problems and provide a system that increases efficiency, a super-turbocharger can be used, which combines the features of a supercharger and a turbocharger. Super-turbochargers merge the benefits of a supercharger, which is primarily good for high torque at low speed, and a turbocharger, which is usually only good for high horsepower at high speeds. A super-turbocharger combines a turbocharger with a transmission that can put engine torque onto the turbo shaft for supercharging and elimination of turbo lag. Once the exhaust energy begins to provide more work than it takes to drive the compressor, the super-turbocharger recovers the excess energy by applying the additional power to the piston engine, usually through the crankshaft. As a result, the super-turbocharger provides both the benefits of low speed with high torque and the added value of high speed with high horsepower all from one system.

SUMMARY

An embodiment of the present invention may comprise a method of facilitating exhaust gas recirculation in a super-turbocharged internal combustion engine comprising: providing a high pressure exhaust port of a first predetermined size in the internal combustion engine; providing a low pressure exhaust port of a second predetermined size in the internal combustion engine, the second predetermined size being substantially larger than the first predetermined size; driving a high pressure super-turbocharger with a least a first portion of high pressure exhaust gases from the high pressure exhaust port; providing at least a second portion of the high pressure exhaust gases from the high pressure exhaust port to an intake manifold of the internal combustion engine; driving a low pressure super-turbocharger with lower pressure exhaust gases from the low pressure exhaust port; providing compressed air from an output of the low pressure compressor to an air input of the high pressure compressor; providing compressed air from an output of the high pressure compressor, at a predetermined pressure, to an intake manifold of the internal combustion engine; opening the high pressure exhaust port while pressure in the high pressure exhaust port is greater than the predetermined pressure so that the second portion of the high pressure exhaust gases recirculate through the internal combustion engine.

An embodiment of the present invention may further comprise a method of facilitating exhaust gas recirculation in a super-turbocharged internal combustion engine comprising: providing a high pressure exhaust port of a first predetermined size in the internal combustion engine; providing a low pressure exhaust port of a second predetermined size in the internal combustion engine, the second predetermined size being substantially larger than the first predetermined size; driving a high pressure super-turbocharger with high pressure exhaust gases from the high pressure exhaust port; driving a low pressure super-turbocharger with lower pressure exhaust gases from the low pressure exhaust port; providing compressed air from an output of the low pressure compressor to an air input of the high pressure compressor; providing compressed air from an output of the high pressure compressor, at a predetermined pressure, to an intake manifold of the internal combustion engine; channeling the high pressure exhaust gases from an output of the high pressure super-turbocharger to an intake manifold of the internal combustion engine; opening the high pressure exhaust port while pressure in the high pressure exhaust port is greater than the predetermined pressure so that the high pressure exhaust gases from the output of the high pressure super-turbocharger recirculate through the internal combustion engine.

An embodiment of the present invention may further comprise a method of facilitating exhaust gas recirculation in a super-turbocharged internal combustion engine comprising: providing a high pressure exhaust port of a first predetermined size in the internal combustion engine; providing a low pressure exhaust port of a second predetermined size in the internal combustion engine, the second predetermined size being substantially larger than the first predetermined size; providing high pressure exhaust gases from the high pressure exhaust port to an intake manifold of the internal combustion engine; driving a low pressure super-turbocharger with lower pressure exhaust gases from the low pressure exhaust port; providing compressed air from an output of the low pressure compressor, at a predetermined pressure, to an intake manifold of the internal combustion engine; opening the high pressure exhaust port while pressure in the high pressure exhaust port is greater than the predetermined pressure so that the second portion of the high pressure exhaust gases recirculate through the internal combustion engine.

DETAILED DESCRIPTION OF THE INVENTION

Figure 1:
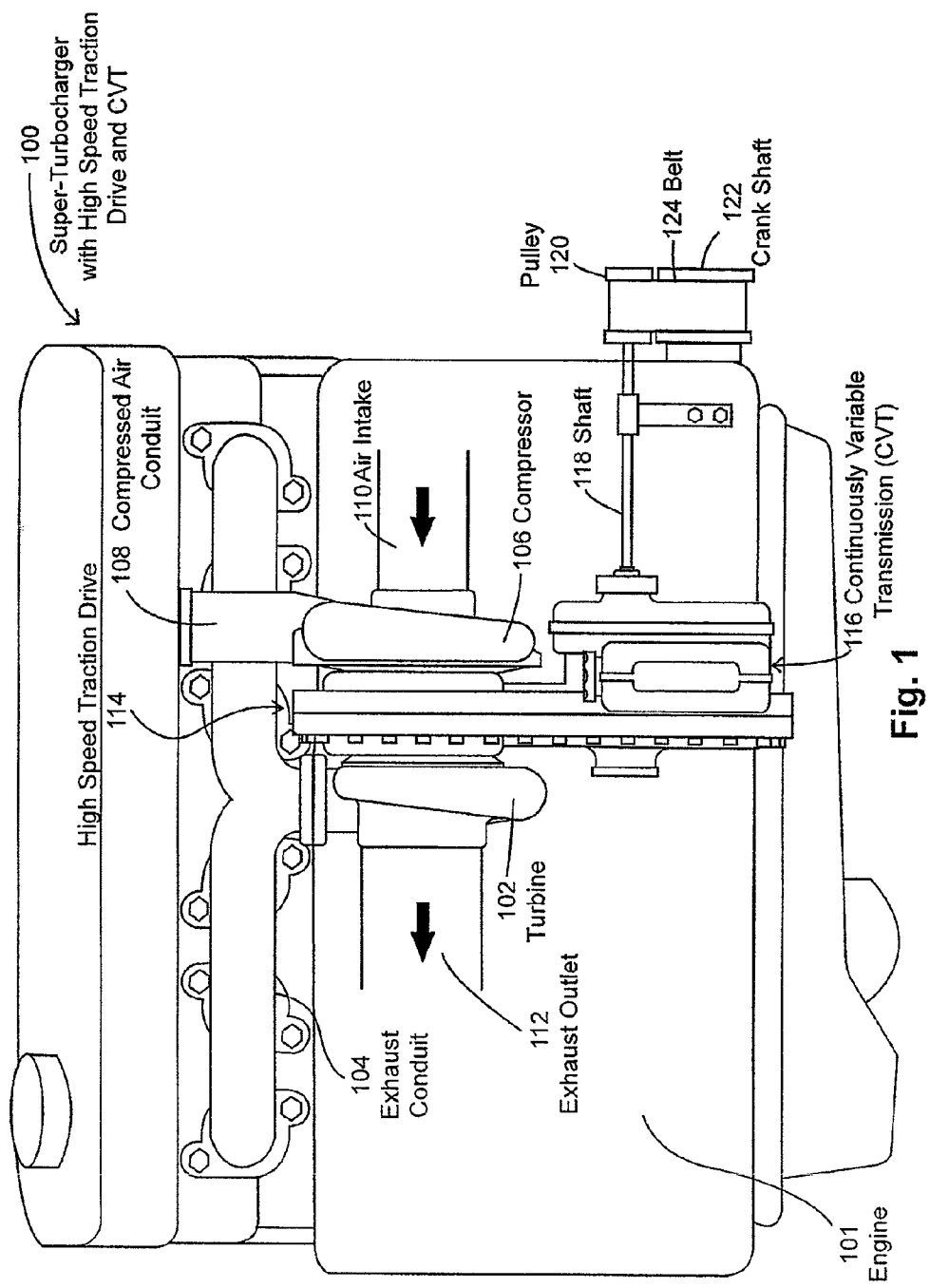
FIG. 1 is a side view illustration of an embodiment of a super-turbocharger.

FIG. 1 is a schematic illustration of an embodiment of a super-turbocharger 100 that uses a high speed traction drive 114 and a continuously variable transmission 116. As shown in FIG. 1, the super-turbocharger 100 is coupled to the engine 101. The super-turbocharger includes a turbine 102 which is coupled to engine 101 by an exhaust conduit 104. The turbine 102 receives the hot exhaust gases from the exhaust conduit 104 and generates rotational mechanical energy prior to exhausting the exhaust gases in an exhaust outlet 112. A catalyzed diesel particulate filter (not shown) can be connected between the exhaust conduit 104 and turbine 102. Alternatively, the catalyzed diesel particulate filter (not shown) can be connected to the exhaust outlet 112. The rotational mechanical energy generated by the turbine 102 is transferred to the compressor 106 via a turbine/compressor shaft, such as shaft 414 of FIG. 4, to rotate a compressor fan disposed in the compressor 106, which compresses the air intake 110 and transmits the compressed air to a conduit 108, which is coupled to an intake manifold (not shown) of the engine 101. As disclosed in the above referenced application, super-turbochargers, unlike turbochargers, are coupled to a propulsion train to transfer energy to and from the propulsion train. The propulsion train, as referred to herein, may comprise the engine 101, the transmission of a vehicle in which the engine 101 is disposed, the drive train of a vehicle in which the engine 101 is disposed, or other applications of the rotational mechanical energy generated by engine 101. In other words, rotational mechanical energy can be coupled or transferred from the super-turbocharger to the engine through at least one intermediate mechanical device such as a transmission or drive train of a vehicle, and vice versa. In the embodiment of FIG. 1, the rotational mechanical energy of the super-turbocharger is coupled directly to a crankshaft 122 of engine 101 through a shaft 118, a pulley 120 and a belt 124. As also illustrated in FIG. 1, a high speed traction drive 114 is mechanically coupled to a continuously variable transmission 116.

In operation, the high speed traction drive 114, of FIG. 1, is a fixed ratio, high speed traction drive that is mechanically coupled to the turbine/compressor shaft using a traction interface to transfer rotational mechanical energy to and from the turbine/compressor shaft. The high speed traction drive 114 has a fixed ratio which may differ in accordance with the size of the engine 101. For small engines, a large fixed ratio of the high speed traction drive 114 is required.

For smaller engines, the compressor and turbine of a super-turbocharger must necessarily be smaller to maintain a small engine size and to match the flow requirements of the compressor and turbine. In order for a smaller turbine and a smaller compressor to function properly, they have to spin at a higher rpm. For example, smaller engines may require the compressor and turbine to spin at 300,000 rpm. For very small engines, such as half liter engines, the super-turbocharger may need to spin at 900,000 rpm. One of the reasons that smaller engines require compressors that operate at a higher rpm level is to avoid surge. In addition, to operate in an efficient manner, the tip velocity of the compressor must be just short of the speed of sound. Since the tips are not as long in smaller compressors, the tips of a smaller compressor are not moving as fast as the tips on larger compressors at the same rpm. As the size of the compressor decreases, the rotational speed required to operate efficiently goes up exponentially. Since gears are limited to approximately 100,000 rpm, standard gear systems cannot be used to achieve the power take off at the higher speeds necessary for a car engine super-turbocharger. Therefore, various embodiments use a high speed traction drive 114 to add and receive power from the turbo shaft.

The rotational mechanical energy from the high speed traction drive 114 is therefore reduced to an rpm level that is variable depending upon the rotational speed of the turbine/compressor, but at an rpm level that is within the operating range of the continuously variable transmission (CVT) 116. For example, the high speed traction drive 114 may have an output that varies between zero and 7,000 rpm while the input from the turbine/compressor shaft may vary from zero to 300,000 rpm, or greater. The continuously variable transmission 116 adjusts the rpm level of the high speed traction drive 114 to the rpm level of the crankshaft 122 and pulley 120 to apply rotational mechanical energy to engine 101, or extract rotational mechanical energy from engine 101 at the proper rpm level. In other words, the continuously variable transmission 116 comprises an interface for transferring rotational mechanical energy between engine 101 and the high speed traction drive 114 at the proper rpm level which varies in accordance with the engine rotational speed and the turbine/compressor rotational speed. Continuously variable transmission 116 can comprise any desired type of continuously variable transmission that can operate at the required rotational speeds and have a ratio to match the rotational speed of the crankshaft 122 or other mechanisms coupled, directly or indirectly, to the engine 101. For example, in addition to the embodiments disclosed herein, two roller CVTs can be used as well as traction ball drives and pushing steel belt CVTs.

Figure 2:
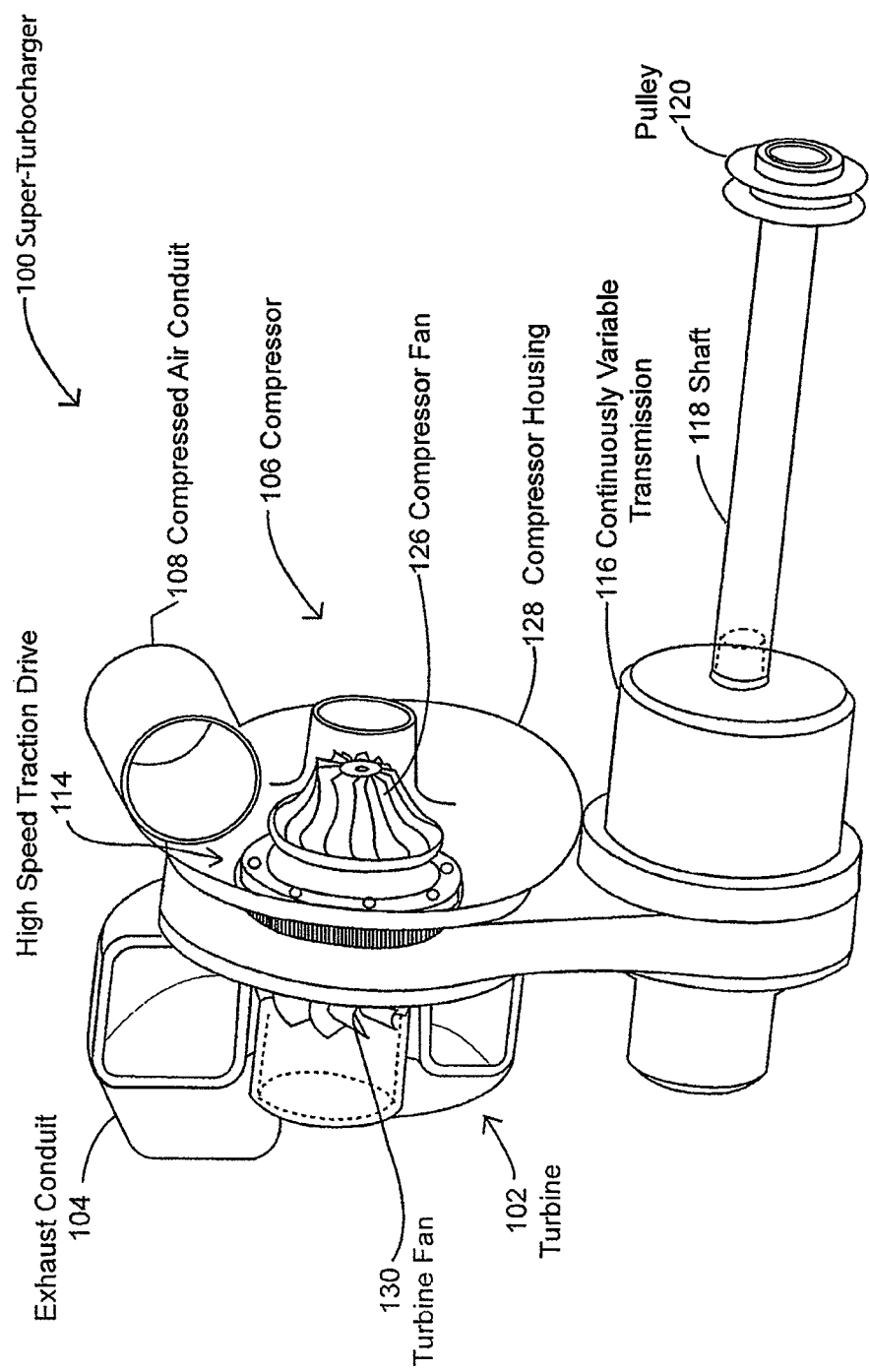
FIG. 2 is a transparency isometric view of the embodiment of the super-turbocharger of FIG. 1.
Figure 11:
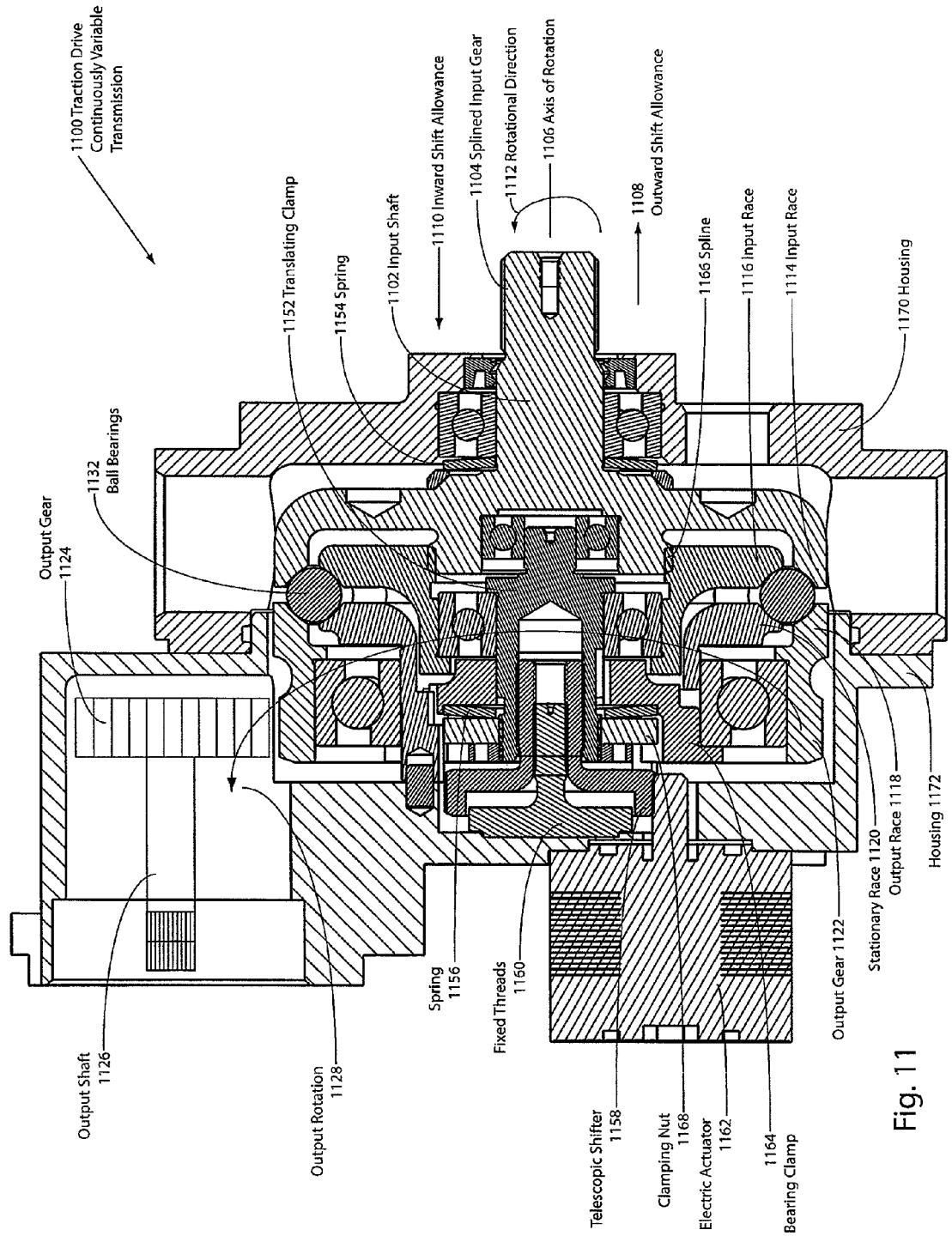
FIGS. 11 and 12 are illustrations of an embodiment of a traction continuously variable transmission.
Figure 12:
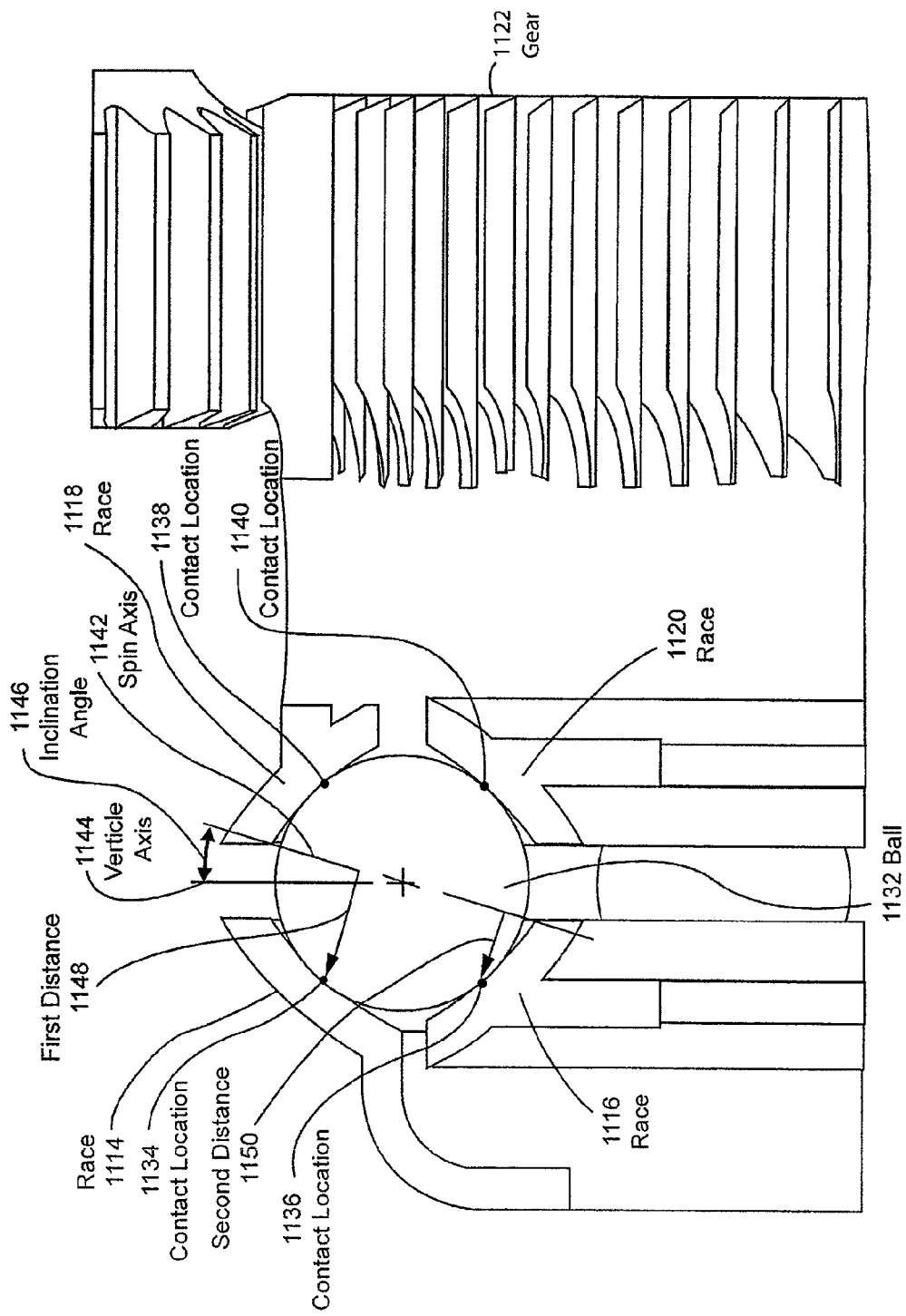

An example of a continuously variable transmission that is suitable for use as continuously variable transmission 116, disclosed in FIG. 1, is the continuously variable transmission disclosed in FIGS. 11 and 12. Other examples of continuously variable transmissions that can be used as the continuously variable transmission 116 of FIG. 1 include U.S. Pat. No. 7,540,881 issued Jun. 2, 2009, to Miller et al. The Miller patent is an example of a traction drive, continuously variable transmission that uses a planetary ball bearing. The traction drive of Miller is limited to about 10,000 rpm so that the Miller continuously variable transmission is not usable as a high speed traction drive, such as high speed traction drive 114. However, the Miller patent does disclose a continuously variable transmission that uses a traction drive and is suitable for use as an example of a continuously variable transmission that could be used as continuously variable transmission 116 as illustrated in FIGS. 1-3. Another example of a suitable continuously variable transmission is disclosed in U.S. Pat. No. 7,055,507 issued Jun. 6, 2006, to William R. Kelley, Jr., and assigned to Borg Warner. Another example of a continuously variable transmission is disclosed in U.S. Pat. No. 5,033,269 issued Jul. 23, 1991 to Smith. Further, U.S. Pat. No. 7,491,149 also discloses a continuously variable transmission that would be suitable for use as continuously variable transmission 116. U.S. Pat. No. 7,491,149 issued Feb. 17, 2009 to Greenwood et al. and assigned to Torotrak Limited discloses an example of a continuously variable transmission that uses a traction drive that can be used as the continuously variable transmission 116. All of these patents are specifically incorporated by reference for all that they disclose and teach. European Application No. 92830258.7, published Aug. 9, 1995, as Publication No. 0517675B1, also illustrates another continuously variable transmission 3 that is suitable for use as the continuously variable traction drive 116.

Various types of high speed traction drives can be used as the high speed traction drive 114. For example, the high speed planetary traction drive 406 disclosed in FIGS. 4-9 and the high speed planetary drive of FIG. 10 can be used as high speed traction drive 114.

Examples of high speed drives that use gears are disclosed in U.S. Pat. No. 2,397,941 issued Apr. 9, 1946 to Birgkigt and U.S. Pat. No. 5,729,978 issued Mar. 24, 1998 to Hiereth et al. Both of these patents are specifically incorporated herein by reference for all that they disclose and teach. Both of these references use standard gears and do not use traction drives. Hence, even with highly polished, specially designed gearing systems, the gears in these systems are limited to rotational speeds of approximately 100,000 rpm or less. U.S. Pat. No. 6,960,147 issued Nov. 1, 2005 to Kolstrup and assigned to Rolounds Roadtracks Rotrex A/S discloses a planetary gear that is capable of producing gear ratios of 13:1. The planetary gear of Kolstrup is an example of a high speed drive that could be used in place of a high speed traction drive 114 of FIG. 1. U.S. Pat. No. 6,960,147 is also specifically incorporated herein by reference for all that it disclosed and teaches.

FIG. 2 is a schematic side transparency view of the super-turbocharger 100. As shown in FIG. 2, turbine 102 has an exhaust conduit 104 that receives exhaust gases that are applied to the turbine fan 130. Compressor 106 has a compressed air conduit 108 that supplies compressed air to the intake manifold. Compressor housing 128 encloses the compressor fan 126 and is coupled to the compressed air conduit 108. As disclosed above, high speed traction drive 114 is a fixed ratio traction drive that is coupled to a continuously variable transmission 116. The continuously variable transmission 116 drives shaft 118 and pulley 120.

Figure 3A:
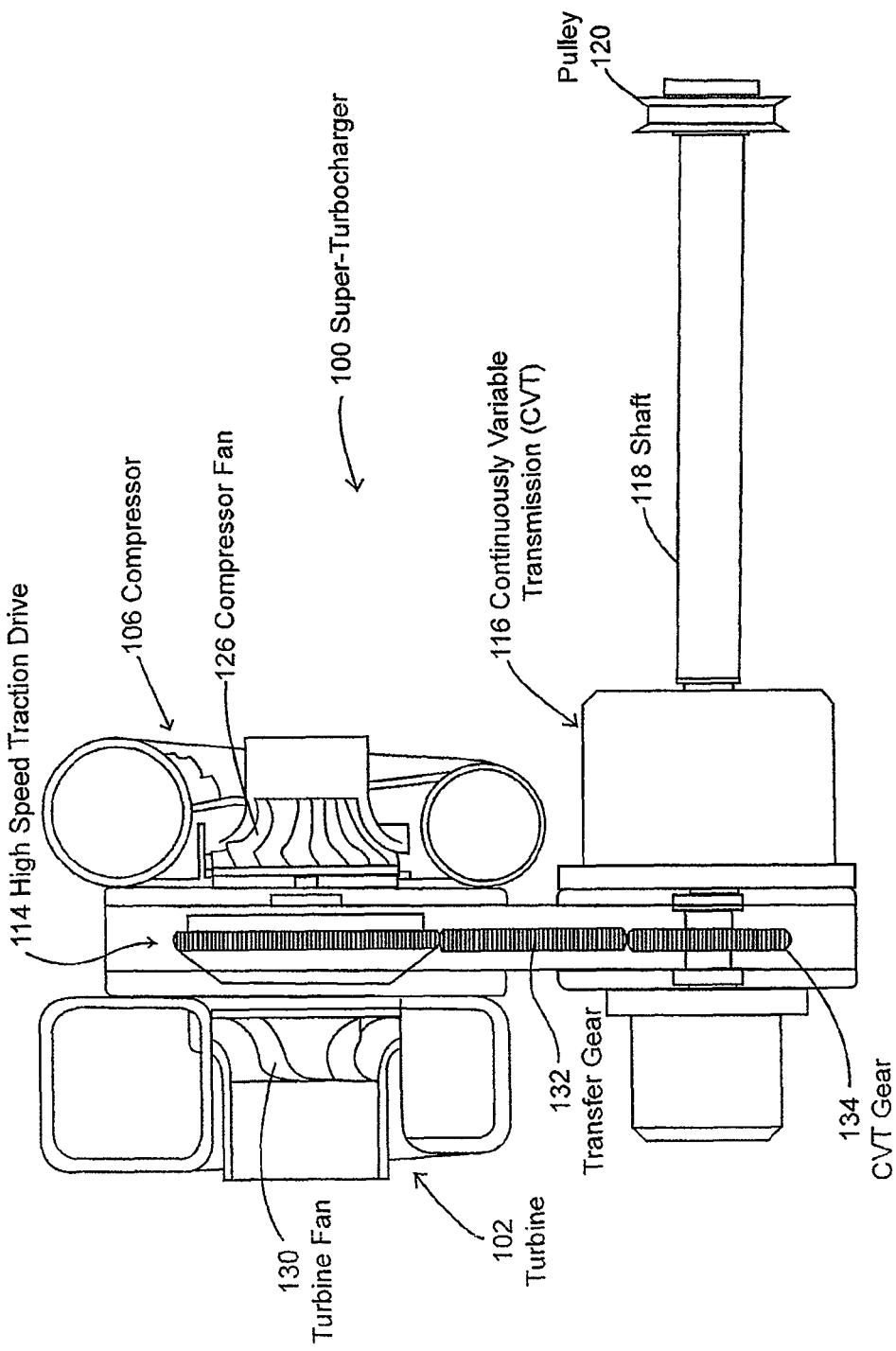
FIG. 3A is a side transparency view of an embodiment of the super-turbocharger illustrated in FIGS. 1 and 2.

FIG. 3A is a side transparency view of the embodiment of the super-turbocharger 100 illustrated in FIGS. 1 and 2. Again, as shown in FIG. 3A, turbine 102 includes a turbine fan 130, while compressor 106 includes a compressor fan 126. A shaft (not shown) connecting the turbine fan 130 and compressor fan 126 is coupled to a high speed traction drive 114. Rotational mechanical energy is transferred from the high speed traction drive 114 to a transfer gear 132 that transfers the rotational mechanical energy to a CVT gear 134 and the continuously variable transmission (CVT) 116. The continuously variable transmission 116 is coupled to the shaft 118 and pulley 120.

Figure 3B:
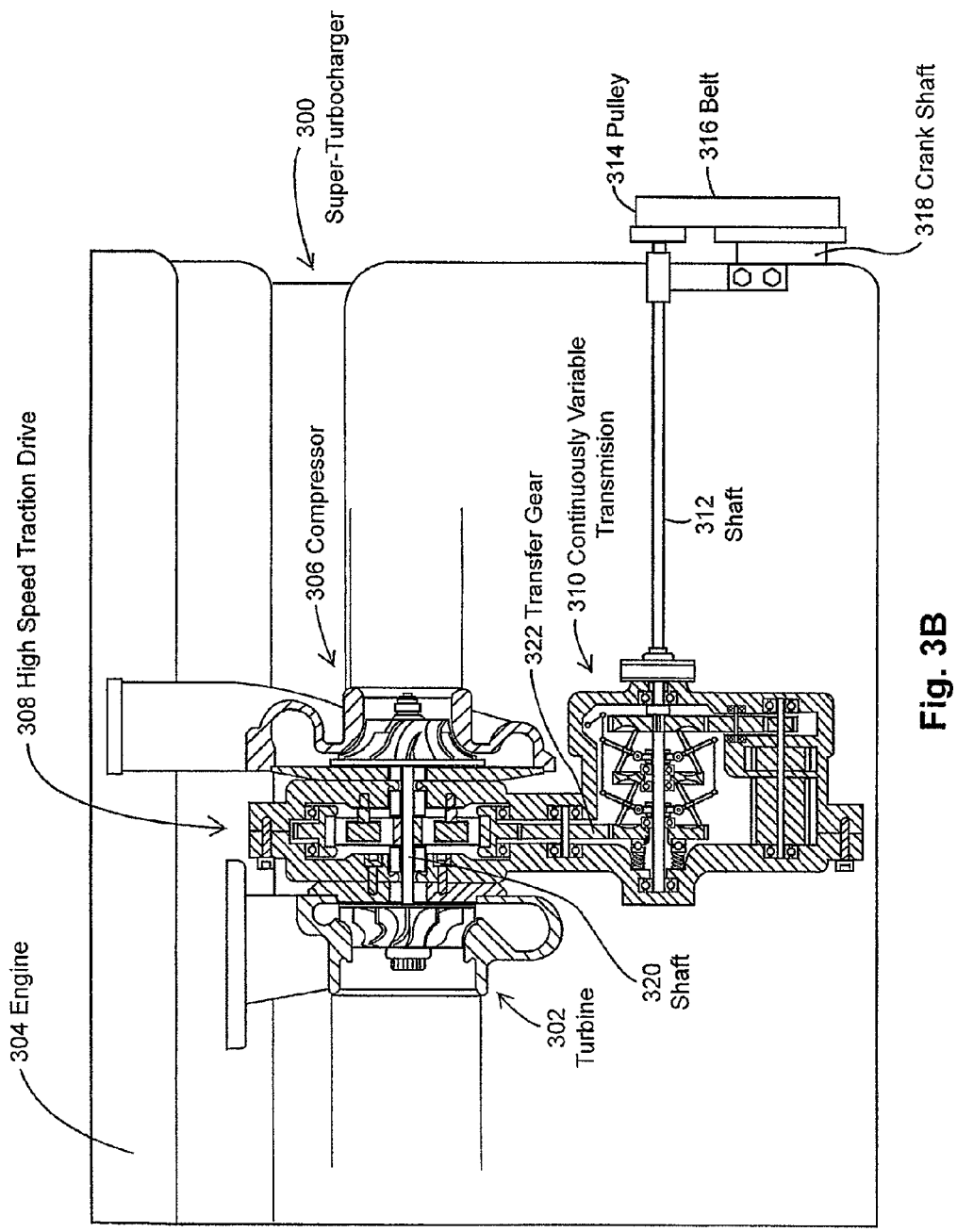
FIG. 3B is a side cutaway view of another embodiment of a super-turbocharger.

FIG. 3B is a schematic cutaway view of another example of a super-turbocharger 300 that is coupled to an engine 304. As shown in FIG. 3B, the turbine 302 and the compressor 306 are mechanically coupled by shaft 320. High speed traction drive 308 transfers rotational mechanical energy to, and receives rotational mechanical energy from, transfer gear 322. A specific example of a high speed traction drive 308 is illustrated in FIG. 3B. Transfer gear 322 transfers rotational mechanical energy between the traction drive 308 and the continuously variable transmission 310. A specific example of a continuously variable transmission 310 is also illustrated in FIG. 3B. Shaft 312, pulley 314 and belt 316 transfer rotational mechanical energy between the crankshaft 318 and the continuously variable transmission 310.

Figure 3C:
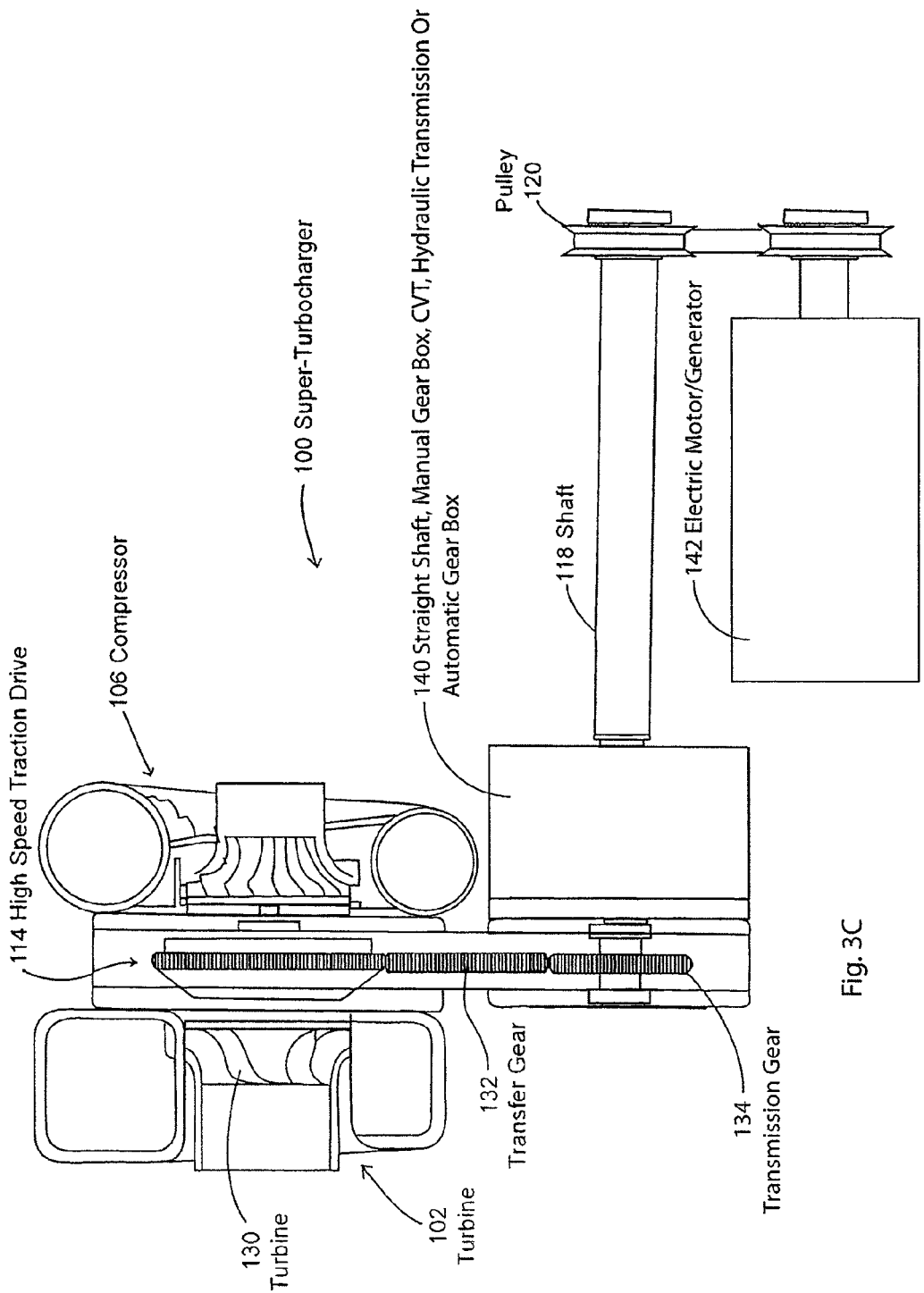
FIG. 3C is a side transparency view of modifications to the embodiment of the super-turbocharger illustrated in FIGS. 1, 2 and 3A.

FIG. 3C is a side schematic cutaway view of modifications to the embodiment of the super-turbocharger 100 illustrated in FIGS. 1, 2 and 3A. As shown in FIG. 3C, turbine 102 and compressor 106 are coupled together by a shaft (not shown). High speed traction device 114 is coupled to the shaft. Rotational mechanical energy is transferred from the high speed traction device 114 to a transfer gear 132 that transfers the rotational mechanical energy to transmission gear 134. High speed traction drive 114, transfer gear 132 and transmission gear 134 may all be housed in the same housing. Transmission gear 134 is connected to a transmission 140 that can comprise a manual gear box, a CVT, a straight shaft, an automatic gear box, or a hydraulic transmission. Transmission 140 is then connected to a shaft 118 which is connected to a pulley 120. Pulley 120 is coupled to the propulsion train. In an alternative embodiment, pulley 120 is coupled to an electric motor/generator 142.

Figure 4:
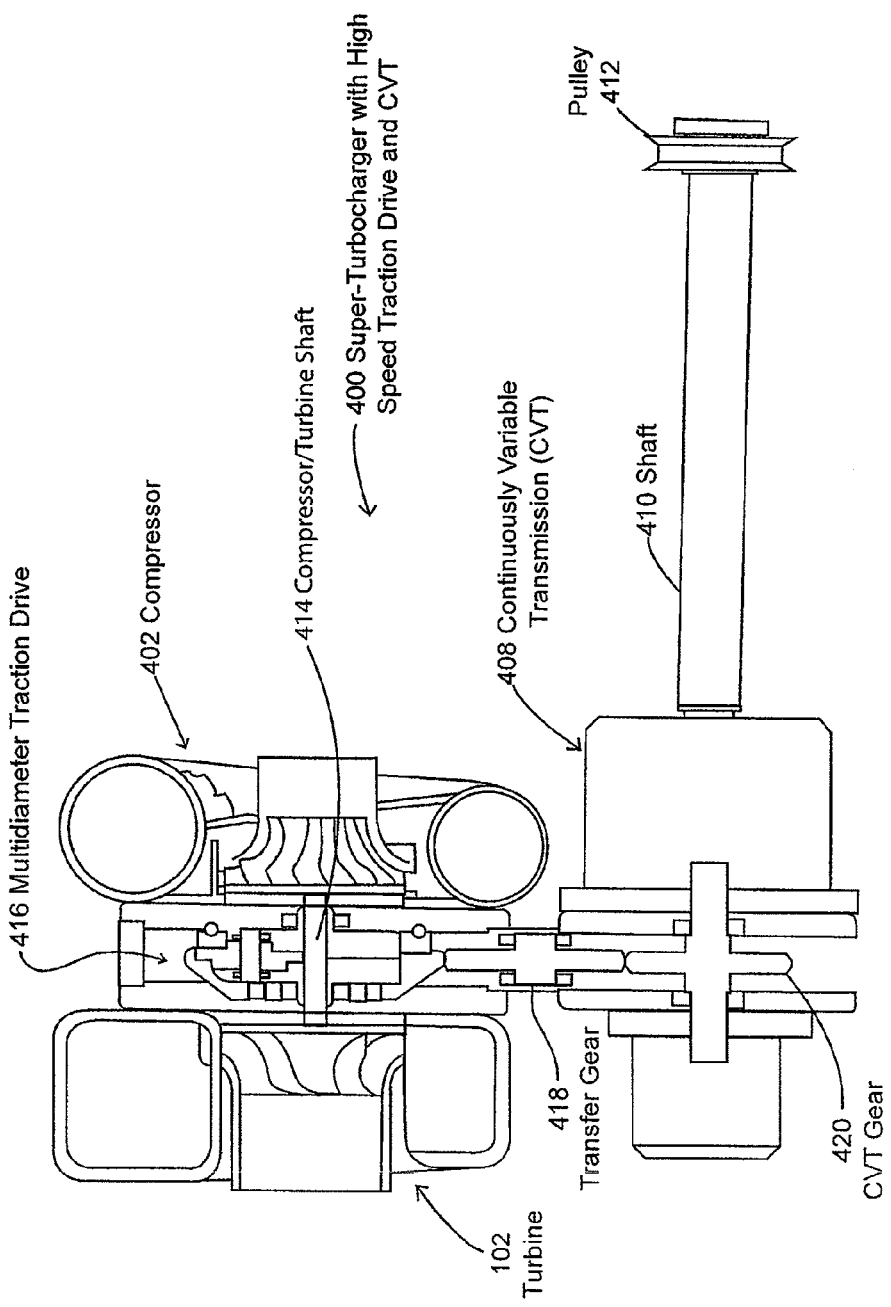
FIGS. 4-9 are various drawings of a super-turbocharger using an embodiment of a multi-diameter planetary roller traction drive.

FIG. 4 is a schematic transparency view of another embodiment of super-turbocharger 400 that utilizes a high speed traction drive 416 that is coupled to a continuously variable transmission 408. As shown in FIG. 4, the turbine 404 is mechanically coupled to the compressor 402 with a compressor/turbine shaft 414. Rotational mechanical energy is transferred between the compressor/turbine shaft 414 and the multi-diameter traction drive 416 in the manner disclosed in more detail below. Transfer gear 418 transfers rotational mechanical energy between the multi-diameter traction drive 416 and the CVT gear 420 of the continuously variable transmission 408. Shaft 410 and pulley 412 are coupled to the continuously variable transmission 408 and transfer power between the continuously variable transmission 408 and a propulsion train.

Figure 5:
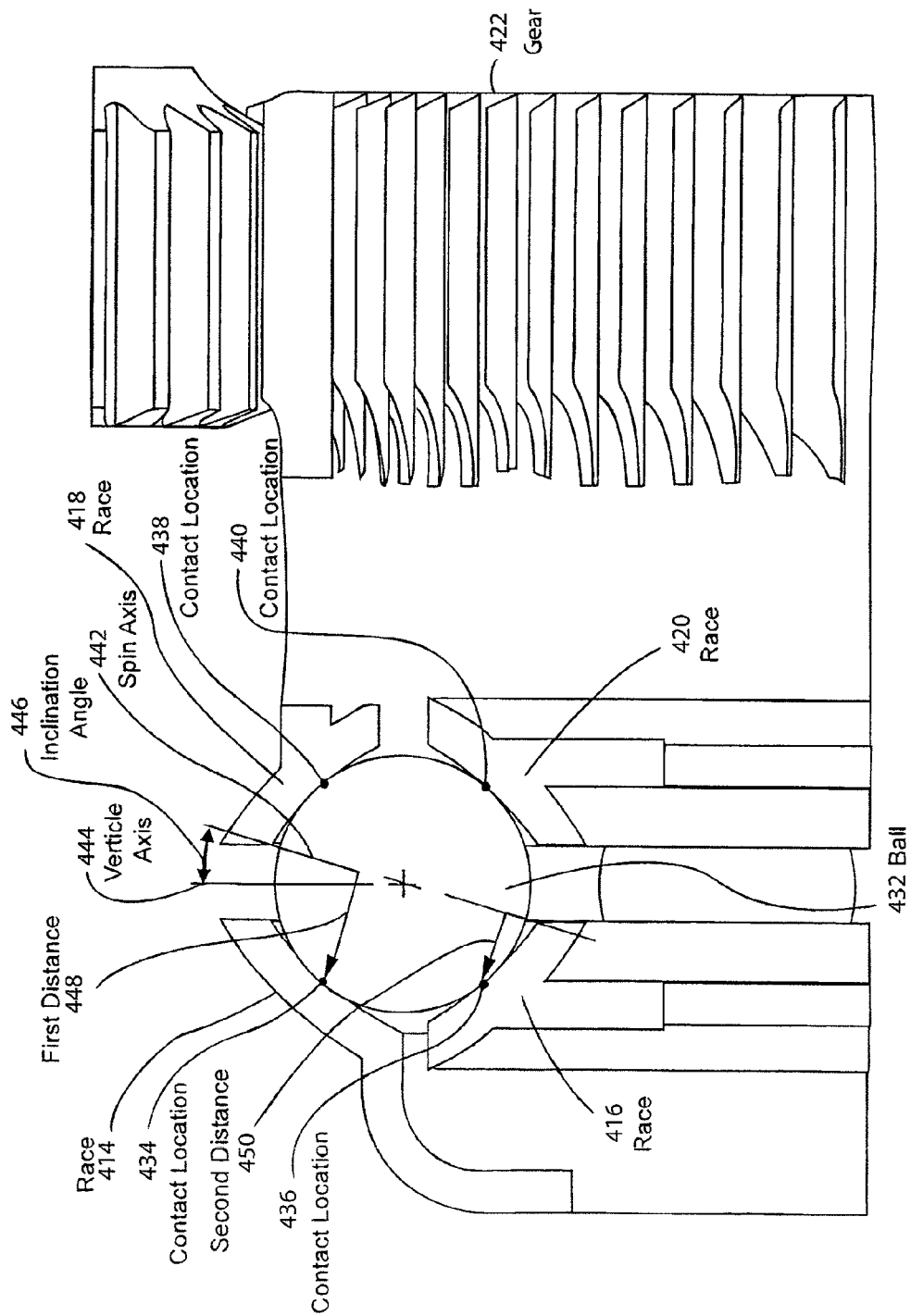

FIG. 5 is a side cutaway schematic view of the multi-diameter traction drive 416 that is coupled to the transfer gear 418, which is in turn coupled to the CVT gear 420. The compressor/turbine shaft 414 has a polished, hardened surface on a central portion, as disclosed in more detail below, that functions as a sun drive in the multi-diameter traction drive 416.

Figure 6:
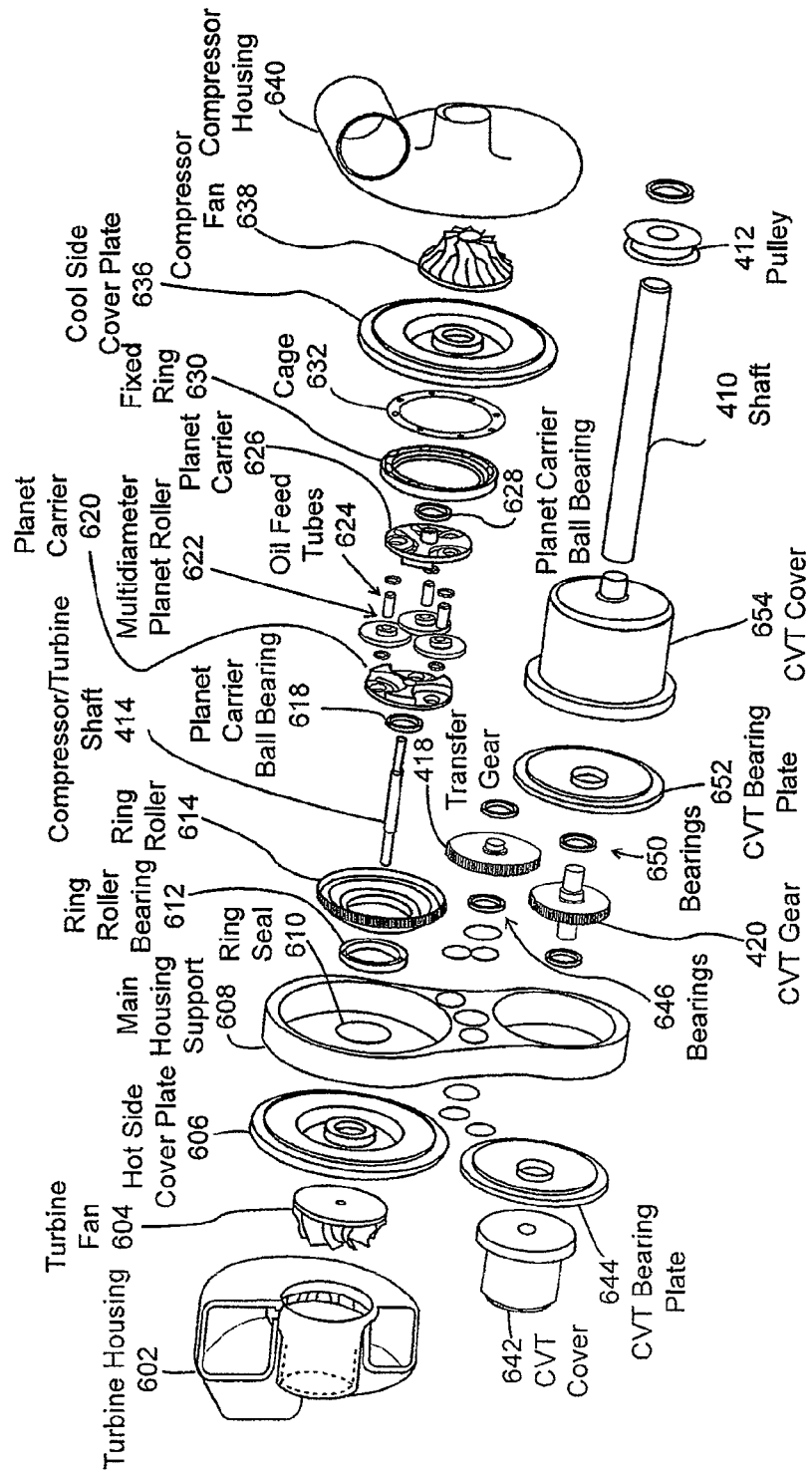

FIG. 6 is an exploded view 600 of the embodiment of the super-turbocharger 400 illustrated in FIG. 4. As shown in FIG. 6, turbine housing 602 houses a turbine fan 604. The hot side cover plate 606 is mounted adjacent to the turbine fan 604 and the main housing support 608. A ring seal 610 seals the exhaust at the hot side cover plate 606. Ring roller bearing 612 is mounted in the ring roller 614. Compressor/turbine shaft 414 extends through the main housing support 608. The hot side cover plate 606 connects with the turbine fan 604. Planet carrier ball bearing 618 is mounted on the planet carrier 620. Multi-diameter ring rollers 622 are rotationally connected to the planet carrier 620. Oil feed tubes 624 are used to supply traction fluid to the traction surface. Planet carrier 626 is mounted to the planet carrier 620 and uses a planet carrier ball bearing 628. Fixed ring 630 is then mounted outside of planet carrier 626. Cage 632 is mounted between the fixed ring 630 and the cool side cover plate 636. Compressor fan 638 is coupled to the compressor/turbine shaft 414. Compressor housing 640 encloses the compressor fan 638. The main housing support 608 also supports the continuously variable transmission and the transfer gear 418. Various bearings 646 are used to mount the transfer gear 418 and the main housing support 608. The continuously variable transmission includes a CVT cover 642 and a CVT bearing plate 644. CVT gear 420 is mounted inside the main housing support 608 with bearings 650. CVT bearing plate 652 is mounted on the opposite side of the CVT gear 420 from the CVT bearing plate 644. CVT cover 654 covers the various portions of the CVT device. Shaft 410 is coupled to the continuously variable transmission. Pulley 412 is mounted on shaft 410 and transfers rotational mechanical energy between shaft 410 and a propulsion train.

Figure 7:
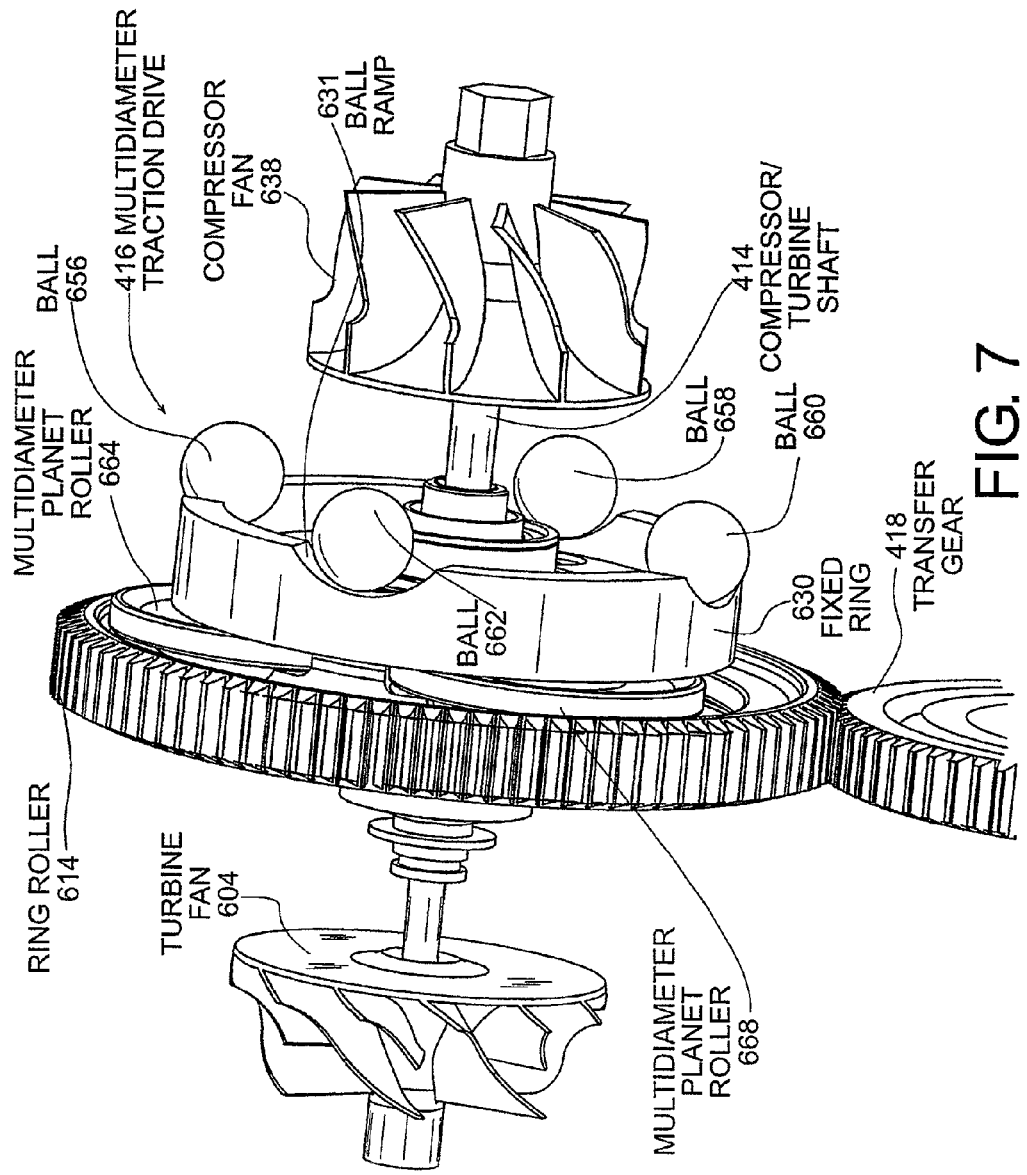
Figure 9:
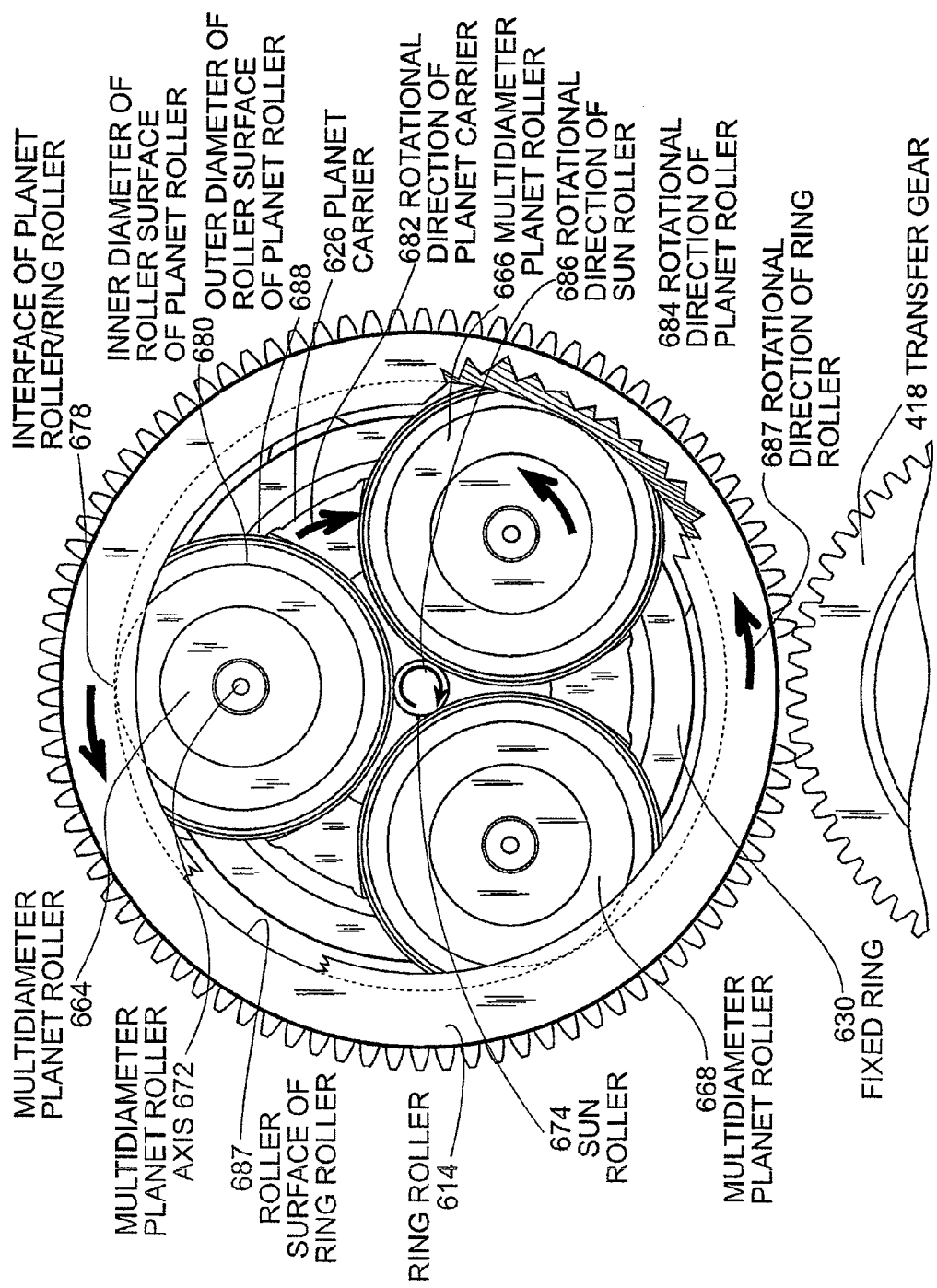

FIG. 7 is a perspective view of isolated key components of the multi-diameter traction drive 416, as well as the turbine fan 604 and compressor fan 638. As shown in FIG. 7, the compressor/turbine shaft 414 is connected to the turbine fan 604 and compressor fan 638, and passes through the center of the multi-diameter traction drive 416. The multi-diameter traction drive 416 includes multi-diameter planet rollers 664, 666 (FIG. 9), 668. These multi-diameter planet rollers are rotationally coupled to a planet carrier 626 (FIG. 9). Balls 656, 658, 660, 662 rest on an incline surface for ball ramps on the fixed ring 630. Ring roller 614 is driven by an inner diameter of the multi-diameter planet rollers 664, 666, 668, as disclosed in more detail below.

Figure 8:
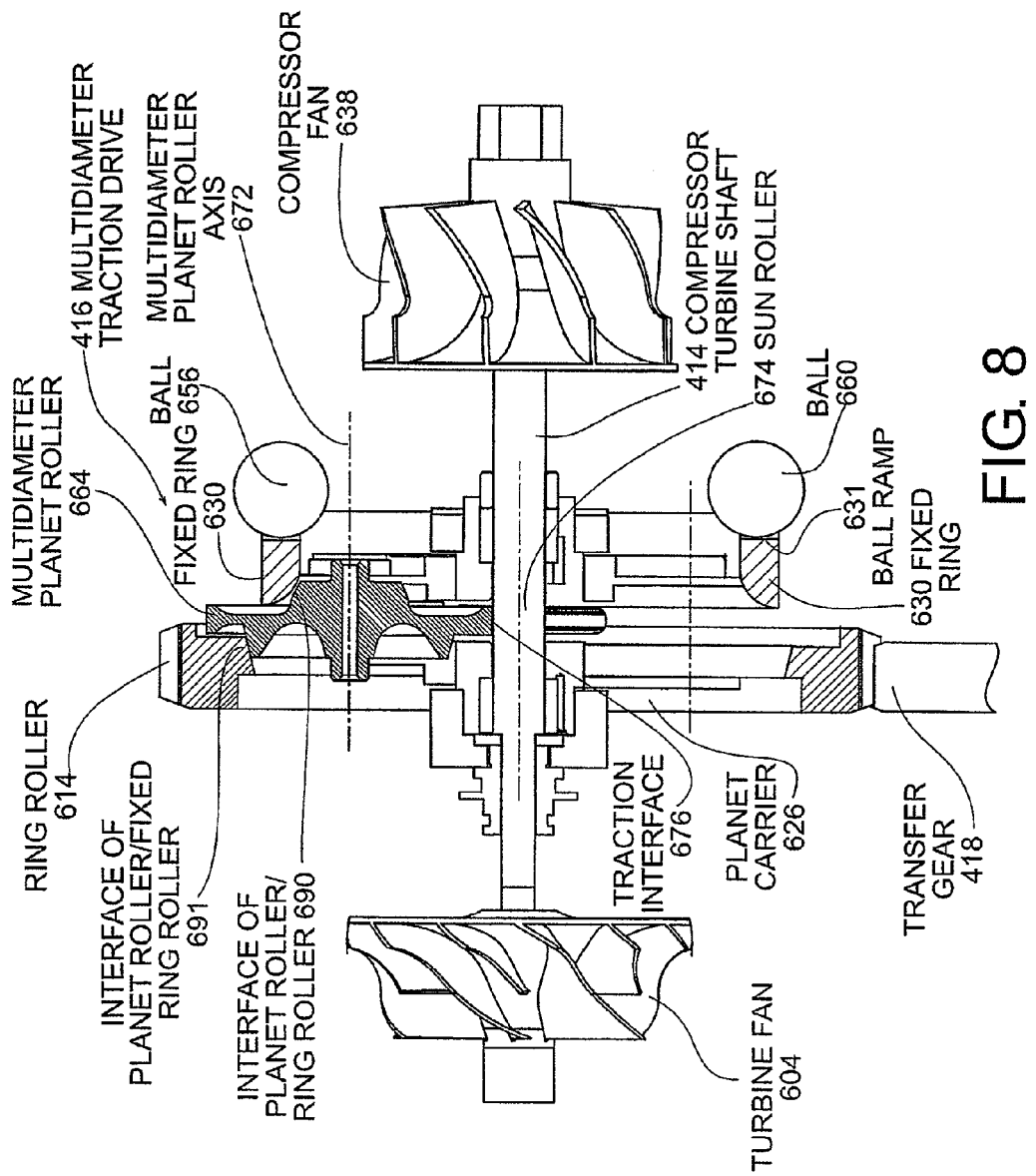

FIG. 8 is a side cutaway view of the multi-diameter traction drive 416. As shown in FIG. 8, the compressor/turbine shaft 414 is hardened and polished to form a traction surface that is used as a sun roller 674 that has a traction interface 676 with the multi-diameter planet roller 664. The multi-diameter planet roller 664 rotates along the multi-diameter planet roller axis 672. The multi-diameter planet roller 664 contacts the fixed ring 630 at the interface 690 of the planet roller 664 and the fixed ring 630. The multi-diameter planet roller 664 contacts the ring roller 614 at interface 691, which is a different radial distance from the multi-diameter planet roller axis 672, than the interface 691. FIG. 8 also illustrates the planet carrier 626 and the ball ramp 630 that intersects with the ball 656, and ball ramp 631 that intersects with ball 660. The balls 656, 658, 660, 662 are wedged in between a housing (not shown) and the ball ramp, such as ball ramp 630, on the fixed ring 664. When torque is applied to the ring roller 614, this causes the fixed ring 664 to move slightly in the direction of the rotation of the ring roller 614. This causes the balls to move up the various ball ramps, such as ball ramps 630, 631, which in turn causes the fixed ring 630 to press against the multi-diameter planet rollers 664, 666, 668. Since the interface 691 of the planet roller 664 and fixed ring 630 is sloped, and the interface of the planet roller 664 and ring roller 690 is sloped, an inward force on the multi-diameter planet roller 664 is generated, which generates a force on the traction interface 676 to increase the traction at the traction interface 676 between the multi-diameter planet roller 664 and the sun roller 674. In addition, a force is created at the interface 691 of the multi-diameter planet roller 664 and the ring roller 614, which increases traction at interface 691. As also shown in FIG. 8, the compressor fan 630 and the turbine fan 604 are both coupled to the compressor/turbine shaft 414. Ring roller 614 is coupled to the transfer gear 418, as also shown in FIG. 8.

FIG. 9 is a side cutaway view of the multi-diameter traction drive 416. As shown in FIG. 9, the sun roller 674 rotates in a clockwise direction, as shown by rotation direction 686. The multi-diameter planet rollers 664, 666, 668 have outer diameter roller surfaces, such as outer diameter roller surface 688 of multi-diameter planet roller 664. These outer diameter roller surfaces contact the sun roller 674 which cause the multi-diameter planet rollers 664, 666, 668 to rotate in a counter-clockwise direction, such as rotational direction 684 of multi-diameter planet roller 666. The multi-diameter planet rollers 664, 666, 668 also have an inner diameter roller surface, such as inner roller diameter roller surface 680 of multi-diameter planet roller 664. The inner diameter roller surface of each multi-diameter planet roller contacts the roller surface 687 of the ring roller 614. Hence, the interface 678 of planet roller 664 with the roller surface 687 of ring roller 614 constitutes a traction interface that transfers rotational mechanical energy when a traction fluid is applied. The interface between each of the multi-diameter planet rollers 664, 666, 668 and sun roller 674 also constitutes a traction interface that transfers rotational mechanical energy upon application of a traction fluid.

As indicated above with respect to FIGS. 8 and 9, the fixed ring 630 generates a force, which pushes the multi-diameter planet rollers 664, 666, 668 towards the sun roller 674 to generate traction. Each of the multi-diameter planet rollers 664, 666, 668 is rotationally attached to the planet carrier 626 with planet roller axes, such as the multi-diameter planet roller axis 672 of the multi-diameter planet roller 664. These axes have a slight amount of play so that the multi-diameter planet rollers 664, 666, 668 can move slightly and create a force between the sun roller 674 and the outer diameter roller surface of the multi-diameter planet rollers 664, 666, 668, such as the outer diameter of the roller surface 688 of the planet roller 664. The movement of the multi-diameter planet roller 664 towards the sun roller 674 also increases the traction at the interface of the multi-diameter planet rollers 664, 666, 668 and the ring roller 614, since the interface between the multi-diameter planet rollers 664, 666, 668 and the ring roller 614, such as interface 678, is sloped. The contact with the multi-diameter planet rollers 664, 666, 668 with the roller surface 687 of ring roller 614 causes the planet carrier 626 to rotate in a clockwise direction, such as the rotational direction 682, illustrated in FIG. 9. As a result, the ring roller 614 rotates in a counter-clockwise direction, such as rotational direction 687, and drives the transfer gear 418 in a clockwise direction.

Figure 10:
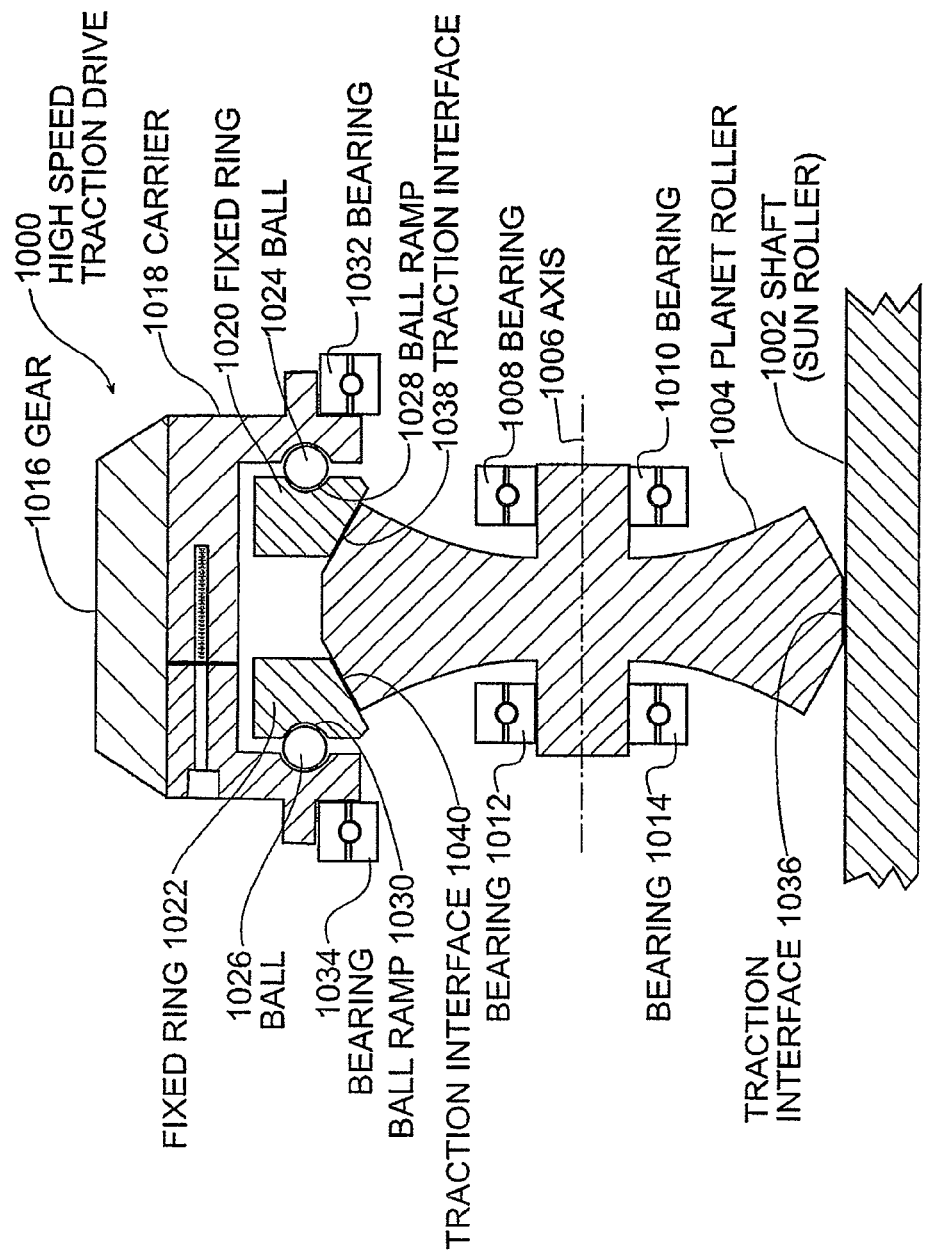
FIG. 10 is an illustration of another embodiment of a high speed traction drive.

FIG. 10 is a schematic cross sectional view of another embodiment of a high speed traction drive 1000. As shown in FIG. 10, a shaft 1002, which is a shaft, that connects a turbine and a compressor in super-turbocharger, can act as a sun roller in the high speed traction drive 1000. Planet roller 1004 contacts the shaft 1002 at traction interface 1036. Planet roller 1004 rotates on an axis 1006 using bearings 1008, 1010, 1012, 1014. As also shown in FIG. 10, gear 1016 is disposed and connected to the outer surface of the carrier 1018. Carrier 1018 is coupled to a housing (not shown) via bearings 1032, 1034, which allow the carrier 1018 and gear 1016 to rotate. Fixed rings 1020, 1022 include ball ramps 1028, 1030, respectively. Ball ramps 1028, 1030 are similar to the ball ramps 630 illustrated in FIGS. 7 and 8. As the gear 1016 moves, the balls 1024, 1026 move in the ball ramps 1028, 1030, respectively, and force the fixed rings 1020, 1022 inwardly towards each other. A force is created between the fixed rings 1020, 1022 and the surface of the planet roller 1004 at traction surfaces 1038, 1040 as the balls 1024, 1026 force the fixed ramps 1020, 1022 inwardly towards each other. The force created by the fixed rings 1020, 1022 also forces the planet roller 1004 downwardly, as illustrated in FIG. 10, so that a force is created between the shaft 1002 and the planet roller 1004 at the traction interface 1036. As a result, greater traction is achieved at a traction interface 1036 and the traction surfaces 1038, 1040. Traction fluid is applied to these surfaces, which becomes sticky and increases friction at the traction interfaces, as the traction fluid is heated as a result of the friction created at the traction interfaces 1036, 1038, 1040.

The high speed traction drive 1000, illustrated in FIG. 10, is capable of rotating at high speeds in excess of 100,000 rpm, which is unachievable by gearing systems. For example, the high speed traction drive 1000 may be able to rotate at speeds greater than 300,000 rpm. However, high speed traction drive 1000 is limited to a gear ratio of approximately 10:1 because of the physical limitations of size. The high speed traction drive 1000 may utilize three planet rollers, such as planet roller 1006 that are disposed radially around the shaft 1002. As illustrated in FIG. 9, the size of the planet rollers is limited with respect to the sun roller, If the diameter of the planet rollers in FIG. 9 increases, the planet rollers will abut each other. Hence, gear ratios of only about 10:1 can be reached with a planetary traction drive, such as illustrated in FIG. 10, while the multi-diameter planet drives that are connected to a planet carrier, such as illustrated in FIGS. 7-9, may have ratios of as much as 47:1 or greater. Accordingly, if a compressor is required for a smaller engine that must rotate at 300,000 rpm to be efficient, a 47:1 ratio traction drive, such as illustrated in FIGS. 7-9, can reduce the maximum rotational speed of 300,000 rpm to approximately 6,400 rpm. Standard geared or traction continuously variable transmissions can then be used to transfer the rotational mechanical energy between the high speed traction drive and the propulsion train of the engine.

As disclosed above, the high speed traction drive 1000, illustrated in FIG. 10, may have a ratio as large as 10:1. Assuming a rotational speed of the shaft 1002 is 300,000 rpm for a super-turbocharger for a small engine, the 300,000 rpm rotational speed of the shaft can be reduced to 30,000 rpm at gear 1016. Various types of continuously variable transmissions 116 can be used that operate up to 30,000 rpm using standard gearing techniques. Traction drive continuously variable transmissions, such as the traction drive continuously variable transmission illustrated in FIGS. 11 and 12, can also be used as the continuously variable transmission 116, illustrated in FIG. 1. Further, ratios of up to 100:1 may be achievable with the multi-diameter traction drive 416, illustrated in FIG. 4-9. Accordingly, small engines of 0.5 liters, which may require a compressor that operates at 900,000 rpm, can be reduced to 9,000 rpm, which is a rotational speed that can be easily utilized by various continuously variable transmissions 116 to couple rotational mechanical energy between a propulsion train and a turbine/compressor shaft.

FIGS. 11 and 12 illustrate an example of a continuously variable traction drive transmission that can be used as the continuously variable transmission 116 of FIG. 1. The traction drive continuously variable transmission illustrated in FIGS. 11 and 12 operates by translating races 1116, 1118 in a lateral direction on race surfaces that have a radius of curvature that causes contact locations of the ball bearings to move, which, in turn, causes the balls to rotate with a different spin angle to drive race 1122 at different speeds. In other words, the contact location of each of the bearings on the race surfaces is changed as a result of the lateral translation of the races 1116, 1118, which alters the speed at which the bearings are rotating at the contact location, as explained in more detail below.

As shown in FIG. 11, input shaft 1102 is coupled to the transfer gear 132 (FIG. 3A). For example, splines 1104 may be splined to the CVT gear 134, illustrated in FIG. 3A. Hence, the spline input gear 1104 of the input shaft 1102 can be coupled to the super-turbocharger through a high speed traction drive 114, as illustrated in FIG. 3A. In this manner, input torque from the propulsion train is used to drive the spline input gear 1104 of the input shaft 1102. The input torque on the spline input gear 1104 imparts a spin in rotational direction 1112 on both the input shaft 1102 and its associated structure including input race 1114. Input race 1116 is also spun around the axis of rotation 1106 in response to the torque imparted by spline 1166 from the input shaft 1102 to the input race 1116. The rotation of the input shaft 1102, input race 1114 and input race 1116 impart a spin on the plurality of ball bearings 1132 because the stationary race 1120 impedes the rotation of the ball bearings at the contact point with stationary race 1120. Input race 1114 and input race 1116 rotate at the same angular speed since they are coupled together through spline 1116. Input race 1114 and input race 1116 cause the ball bearings 1132 to spin in a substantially vertical orientation since the ball bearings 1132 contact the stationary race 1120. The contact of the ball bearings 1132 against the stationary race 110 also causes the ball bearings 1132 to process around the perimeter of the races 1114, 1116, 1118, 1120. In the embodiment illustrated in FIG. 11, there may be as many as 20 ball bearings 1132 that rotate on the surfaces of the races 1114, 1116, 1118, 1120. The rotation of the ball bearings 1132 as a result of being driven by input race 1114 and input race 1116 creates a tangential contact of the ball bearings 1132 on the output race 1118. Depending upon the contact position of the ball bearings 1132 on the output race 1118, the ratio of the rotational speed of the input races 1114, 1116 with respect to the output race 1118 can be varied. Output race 1118 is coupled to output gear 1122. Output gear 1122 engages output gear 1124, which in turn is connected to the output shaft 1126.

The manner in which the traction drive continuously variable transmission 1100, illustrated in FIG. 11, shifts the ratio between the input shaft 1102 and the output shaft 1126 is accomplished by changing the relative position of the contact point between the four races 1114, 1116, 1118, 1120 that are in contact with the ball bearings 1132. The manner in which the contact surfaces of the races 1114, 1116, 1118, 1120 with the ball bearings 1132 is changed is by shifting the position of the translating clamp 1152. The translating clamp 1152 is moved horizontally, as illustrated in FIG. 11, in response to electric actuator 1162. Electric actuator 1162 has a shaft that engages the telescopic shifter 1158 and rotates the telescopic shifter 1158. Telescopic shifter 1158 has different thread types on an inside portion and an outside portion. A difference in thread pitch of the different thread types causes the translating clamp 1152 to translate horizontally in response to rotation of the shaft of the electric actuator 1162, which imparts rotation in the telescopic shifter 1158. Lateral translation of the translating clamp 1152, which is in contact with bearing clamp 1164, causes lateral transition of input race 1116 and output race 1118. Lateral translation of the input race 1116 and output race 1118 may vary, in the embodiment illustrated in FIG. 11, by approximately one-tenth of an inch. The translation of the input race 1116 and the output race 1118 changes the angle of contact between the ball bearings 1132 and the output race 1118, which changes the ratio, or speed at which the ball bearings 1132 are moving in the races because of a change in contact angle between the stationary race 1120 and input race 1114 and input race 1116. The combination of the change in angle between the races allows the contact velocity, or the point of contact between the ball bearings 1132 and output race 1118, to vary which results in a variation of speed of between 0 percent of the rotational speed of the input shaft 1102 up to 30 percent of the rotational speed of the input shaft 1102. The variation of speed in the output race 1118 of 0 percent to 30 percent of the rotational speed of the input shaft 1102 provides a wide range of adjustable rotational speeds that can be achieved at the output shaft 1126.

To ensure proper clamping of the ball bearings 1132 between the races 1114, 1116, 1118, 1120, springs 1154, 1156 are provided. Spring 1154 generates a clamping force between input race 1114 and stationary race 1120. Spring 1156 generates a clamping force between input race 1116 and output race 1118. These clamping forces against the ball bearings 1132 are maintained over the entire translating distance of the translating clamp 1152. The telescopic shifter 1158 has threads on an inside surface that connect to the threads on the fixed threaded device 1160. The fixed threaded device 1160 is fixed to housing 1172 and provides a fixed position relative to the housing 1172 so that the translating clamp 1152 is able to translate in a horizontal direction as a result of the differential threads on the two sides of the telescopic shifter 1158.

As also illustrated in FIG. 11, the rotating components of the traction drive continuously variable transmission 1100 all rotate in the same direction, i.e. rotational direction 1112 and output rotation 1128 of the output gear 1122. Clamping nut 1168 holds spring 1156 in place and preloads the spring 1156 to create the proper diagonal pressure between stationary race 1120 and input race 1114. When the translating clamp 1152 is horizontally translated, as illustrated in FIG. 11, there is a slight translation of the input shaft 1102 based upon the angles of the races 1114-1120 that contact the ball bearings 1132. The spline input gear 1104 allows translational movement in directions 1108, 1110 based upon the points at which the ball bearings 1132 contact the races 1114-1120 and the particular contact angle of the races with respect to the ball bearings 1132. Housing 1170 is bolted tightly to housing 1172 to contain the spring 1154, which creates the proper amount of clamping force between input race 1114 and stationary race 1120. Ball bearings 1132, as illustrated in FIG. 11, have a rotational progression 1131 in the four races 1114, 1116, 1118, 1120. The rotational direction 1112 of the shaft 1102 causes the gear 1122 to rotate in a rotational direction 1128, as illustrated in FIG. 11.

FIG. 12 is a closeup view of the races 1114-1120 and ball 1132, illustrating the operation of the traction drive continuously variable transmission 1100. As shown in FIG. 12, race 1114 forcibly contacts ball 1132 at contact location 1134. Race 1116 forcibly contacts ball 1132 at contact location 1136. Race 1118 forcibly contacts ball 1132 at contact location 1138. Race 1120 forcibly contacts ball 1132 at contact location 1140. Each of the contact locations 1134, 1136, 1138, 1140 is located on a common great circle on the surface of the ball 1132. The great circle is located in a plane that contains the center of the ball 1132 and the axis 1106 of the shaft 1102. Ball 1132 spins about a spin axis 1142 passing through the center of the ball 1132 and bisects the great circle containing contact locations 1134, 1136, 1138, 1140. The spin axis 1142 of the ball 1132 is inclined at an angle 1146 with the vertical axis 1144. The inclination angle 1146 is the same for each of the balls disposed in the races around the circumference of the traction drive 1100. The inclination angle 1146 establishes a mathematical relationship between a distance ratio and a circumferential velocity ratio. The distance ratio is the ratio between the first distance 1148, which is the orthogonal distance from the spin axis 1142 to the contact location 1134, and a second distance 1150, which is the orthogonal distance from the spin axis 1142 to contact location 1136. This distance ratio is equal to the circumferential velocity ratio. The circumferential velocity ratio is the ratio between the first circumferential velocity and the second circumferential velocity, where the first circumferential velocity is the difference between the circumferential velocity of ball 1132 at race 1114 and a common orbital circumferential velocity of ball 1132 and the other balls in the races, while the second circumferential velocity is the difference between the circumferential velocity of the ball 1132 on the race 1116 and the common orbital circumferential velocity of the ball 1132, as well as the other balls disposed in the races. The radius of curvature of each of the races 1114-1120 is larger than the radius of curvature of ball 1132. In addition, the radius of curvature of each of the races 1114-1120 need not be a constant radius of curvature, but can vary. Further, the radius of curvature of each of the four races does not have to be equal.

When races 1116, 1118 translate simultaneously in a lateral direction, such as lateral translation direction 1108, the speed ratio of the rotation of shaft 1102 and the rotational direction 1112 change with respect to the rotation of the gear 1122 and rotational direction 1128. Translation of races 1116, 1118 in lateral translation direction 1108 causes the first distance 1148 to be larger and the second distance 1150 to be smaller. Hence, the ratio of distances, as well as the circumferential velocity ratio, changes, which changes the rotational speed of the gear 1122 with respect to shaft 1102.

As indicated above, the continuously variable transmission output is in gear contact with the traction drive speed reduction mechanism that connects to the turbine compressor shaft. As indicated above, there are at least two or three different types of traction drive speed reduction systems that may be used. The typical type is a planetary type traction drive for high speed reduction, which is disclosed in FIGS. 6-9, and FIG. 10. If a large speed differential between the turbine shaft and the planetary roller is desired, the embodiment of FIG. 10 may utilize only two rollers instead of three, in order to get the gear ratio change that is desired.

With three rollers, a limit of about a 10:1 reduction in speed exists and there may be a need for more like a 20:1 transmission to get the high speed 250,000 rpm operation below the 25,000 rpm to which a 10:1 transmission would require. Therefore, a two roller planetary traction drive can be used in place of a three planetary drive system, in FIG. 10, in order to achieve the speed reduction required of the smallest highest speed systems. Two rollers also provide for lower inertia, as each roller adds some amount of inertia to the system. For the lowest inertia, two rollers should be sufficient. The width of the traction roller is slightly wider than a three roller embodiment.

The multi-diameter planet rollers that roll against the shaft are made of a springy material, e.g., either a spring steel or another material, that allows some deformation of the roller within the outer drum. The application of a spring loaded roller can provide the necessary pressure on the shaft, but not restrict the shaft's ability to find its ideal center of rotation.

When a turbocharger operates at extremely high speeds, it has balance constraints that cause the shaft to need to find its own center of rotation. The balance will be compensated by the movement of the center shaft. This movement can be compensated by spring-loaded rollers. The spring-loaded rollers can also be made extremely light weight by making them out of a thin band of steel that allows them to operate against the shaft with very low inertia. The band thickness must be thick enough to put sufficient pressure on the traction surfaces to provide the normal force needed for traction. A cam follower can be disposed inside the roller that will position each roller and hold that position within the system. Rollers need to operate in a very straight alignment between the outer drum and the turbine/compressor shaft, but the key to low inertia is lightweight. One or two cam followers can be utilized to hold the steel band in place, such that the steel band stays in alignment in the system.

The ring roller 614 is connected to a gear on the outside surface so that the ring roller can transmit the power in or out of the multi-diameter traction drive 416. The ring roller 614 can be made in numerous ways. Ring roller 614 can simply be a solid piece of steel or other appropriate material that is capable of transmitting the torque in and out of the multi-diameter traction drive 416. Ring roller 614 can be made of numerous materials that allow ring roller 614 to be lightweight, but ring roller 614 has to be from a material that can be used as a traction drive surface on the roller surface 687. A proper roller surface 687 allows the planet rollers 664, 666, 668 to transmit the torque through traction.

Also, turbine/compressor shaft 414 needs to be held in very accurate alignment. The alignment of the turbine/compressor shaft 414, within the housing, allows the clearances to be held between the tips of the blades of the compressor and the compressor housing. A tighter clearance increases the compressor efficiency. A more accurate position decreases the chance of touching between the turbine compressor fan 638 and the compressor housing 640. A method of controlling the thrust load that comes from compressing the gas against the compressor wheel is necessary to ensure that there is a minimum of clearance. This can be done using a thrust bearing (not shown) that is oil fed or a thrust bearing that is a ball bearing or roller bearing type of bearing.

Typically, in a turbocharger, the bearings are, for reliability purposes, sleeve bearings that have an oil clearance both on the inside and the outside in order to allow for the turbine shaft to center itself in its harmonic rotation. The balancing requirements for a high volume manufactured turbocharger are reduced by using a double clearance bearing. These bearing types have been used because of the requirement of tighter clearances and more accurate alignment of the shaft of the turbocharger. A ball bearing is used for both holding the compressor and turbine and for maintaining better alignment to the housing from a side-to-side motion perspective. This can be accomplished with one or two ball bearings. Alignment of bearings within an outer area that is pressurized with oil allows the bearings to float and allows the bearing to find a center. This does affect the clearance between the housing, turbine and compressor outside edges, but allows thrust clearance to remain small. Turbo shaft bearings provide a third point of constraint to maintain alignment of the rollers. Cam followers in the middle of the rollers can keep the rollers at 120 degrees from one another. Two small cam followers can be used for each roller to eliminate backlash when power changes direction.

Also, a larger turbine can be used. The turbine wheel can be made larger in diameter than normal. It is possible to make the turbine outer diameter even larger than the compressor wheel, without hitting the critical speed where tips come close to the speed of sound, because the density of the exhaust is lower than inlet air and therefore the speed of sound is higher. This allows the exhaust to generate more torque on the turbine/compressor shaft without higher backpressure. Having higher torque causes the turbine to recover more energy than is required to compress the intake air. This produces more energy than can be recovered and transmitted to the engine. More energy from the same exhaust gas flow that is not needed for compression gets transferred to the crankshaft and creates lower fuel consumption.

Further, turbine efficiency can be improved by using guide vanes that control the angle of incidence which exhaust gases impact the turbine wheel. This makes the peak efficiency higher, but narrows the speed range upon which that efficiency is achieved. A narrow speed range is bad for a normal turbocharger, and is not a problem for a super-turbocharger where the governor can provide the necessary speed control.

Higher backpressure across the turbine compared to the pressure across the compressor can also create an unbalanced super-turbocharger. For a normal turbocharger, this pressure difference is the other way around. Having higher backpressure causes the turbine to recover more energy than is required to compress the intake air. This produces more energy that can be recovered and transmitted to the engine. Higher backpressure is needed for high pressure EGR loops on diesel engines. High backpressure normally requires a valve or a restriction, so high backpressure is normally lost energy because a normal turbocharger cannot be unbalanced without over-speeding. Increasing backpressure is bad for gasoline and natural gas engines, because it increases the amount of exhaust gas that gets trapped in the cylinder, which makes the engine more likely to have detonation problems.

In accordance with another embodiment, a second turbine wheel can be positioned on the turbine/compressor shaft to increase the energy recovered by the turbine and improve the fuel efficiency of the engine system. Also, a second compressor wheel can be positioned on the same shaft to increase the boost pressure potential of the super-turbocharger and allow intercooling between the stages. This makes the intake temperature cooler for a given boost and therefore lowers NOx.

In addition, turbine blade cooling can be provided through the wing tips to reduce temperatures in high temperature applications. This can be done with hollow wing tips at the outer edge of the turbine. This special tip design increases turbine efficiency and provides a path for cooling air to get through the blades. Turbine wing cooling can also be provided by compressed air from the compressor side fed across the housing to the back side of the turbine wheel. In addition, a heat pipe can be used to cool the turbine wheel and blades.

In addition, a torsional softening device can be used on the power path. Crankshaft energy or rotational mechanical energy from a propulsion train can be brought through a flex shaft or an impulse softening device (either spring loaded or flexing) in such a way that torque impulses from the engine or propulsion train are removed without loss of that energy, before entering the housing. By not impacting the transmission with high torque spikes on the traction drive, the peak torque requirement is reduced. By eliminating these torque spikes, traction drives are more reliable, because the traction requirements are limited by the maximum torque on the system. By minimizing these torque spikes on the traction drives, the size and surface contact areas of the traction drives can be minimized. Minimal surface contact areas maximize efficiency of the system, and can still achieve the torque required for transmitting the continuous power.

Alternatively, and in accordance with another embodiment, a variable speed traction drive design with fixed displacement hydraulic pumps in place of the shaft, belt or gear drive may be utilized. This makes the system easier to package, which could be especially useful on very big engines having multiple turbochargers.

Figure 13:
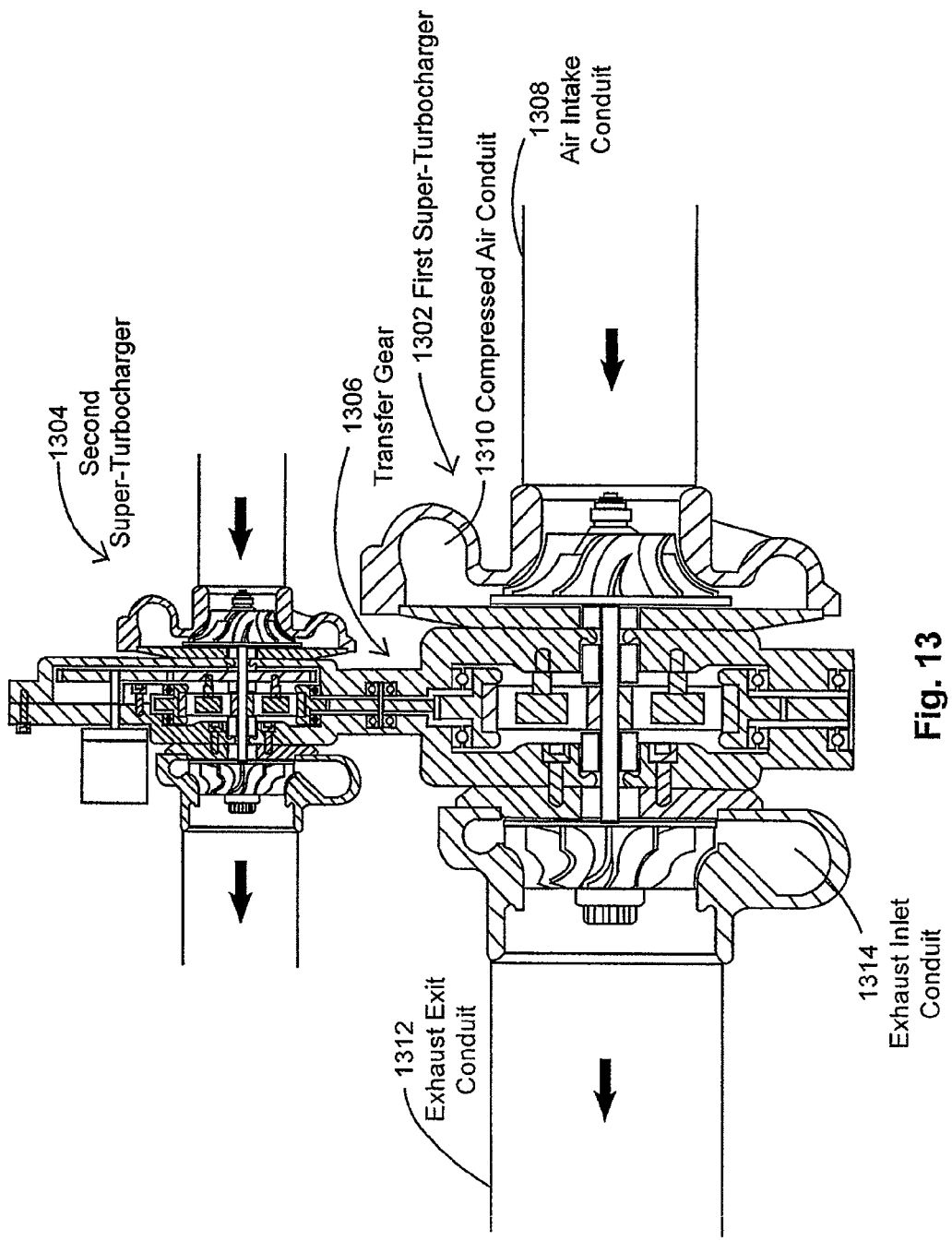
FIG. 13 is a side cutaway view of another embodiment.

In a further embodiment, illustrated in FIG. 13, a second super-turbocharger is run off one transmission as a way to get a higher pressure ratio, and as a way to get cooler intake temperatures by using a second intercooler. This is possible with a fixed speed ratio between the two super-turbochargers. The first super-turbocharger 1302 has an air intake conduit 1308 and compresses air, which is supplied to the engine from compressed air conduit 1310. Exhaust air conduit 1314 receives exhaust gas from the engine to run the turbine of the first super-turbocharger 1302. The exhaust gas exits the exhaust exit conduit 1312. The first super-turbocharger 1302 is coupled to the second super-turbocharger 1304 with a transfer gear 1306.

Figure 14A:
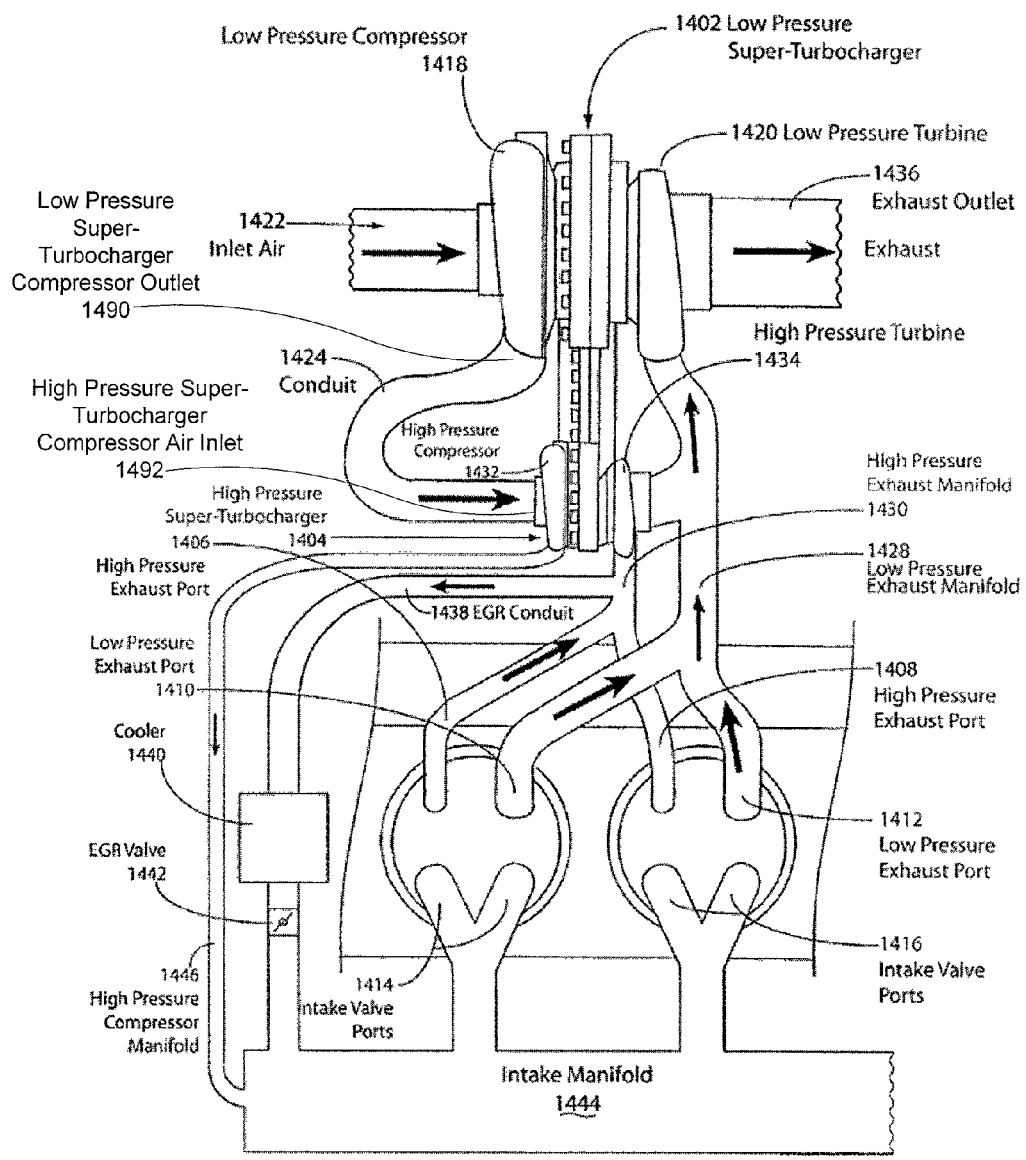
FIG. 14A is a schematic view of an embodiment of a super-turbocharged gas recirculation device.

FIG. 14A illustrates another embodiment of an implementation of the use of two super-turbochargers, such as low pressure super-turbocharger 1402 and high pressure super-turbocharger 1404. A standard super-turbocharger does not do a good job of recovering the high-pressure pulse that comes out of the cylinder when the exhaust valve first opens. To improve this impulse pressure recovery, as illustrated in FIG. 14A, the high pressure exhaust valve ports 1406, 1408 are separated from the low pressure exhaust valve ports 1410, 1412 of a four-valve engine. The high pressure exhaust ports 1406, 1408 are directed to high pressure turbine 1434 via high pressure exhaust manifold 1430, while low pressure exhaust ports are directed to low pressure turbine 1420, via low pressure exhaust manifold 1428. By changing valve timing of the valves in the high pressure exhaust ports 1406, 1408, such that valves on the high pressure exhaust ports 1406, 1408 are opened first and ported to the high pressure turbine 1434, the pulse energy is recovered better. The valves on the high pressure exhaust ports 1406, 1408 are closed quickly, and then the valves on the low pressure exhaust ports 1410, 1412 are opened for the duration of the exhaust stroke. The valves on the low pressure exhaust ports 1410, 1412 are ported to a low pressure turbine 1420. This process reduces the work required by the piston to exhaust the cylinder. This process improves idle fuel efficiency, or at least eliminates parasitic losses at idle. The outlet of the high-pressure turbine 1434 is also connected to the low-pressure turbine 1420. A catalyzed diesel particulate filter (not shown) can also be disposed before the lower pressure turbine.

As also illustrated in FIG. 14A, an EGR conduit 1438 is connected to the high pressure exhaust manifold 1430. The EGR conduit 1438 allows a portion of the exhaust from the high pressure exhaust manifold 1430 to be channeled back to the intake manifold 1444, via cooler 1440 and EGR valve 1442. The exhaust from the high pressure exhaust manifold 1430, that is channeled through the EGR conduit 1438, is channeled to the intake manifold 1444 for the purpose of the recirculation of exhaust gases. The exhaust gases flowing through the exhaust gas recirculator conduit 1438 assist in lowering the combustion temperature in the combustion chamber, especially after being cooled in cooler 1440. The exhaust gases contain moisture and other liquids that assist in lowering the temperature of the combustion chamber to thereby reduce NOx emissions from the engine. The amount of recirculated exhaust gas is controlled by the EGR valve 1442. EGR valve 1442 can be fixed, such as through the use of a restrictor valve, or can be varied, depending upon the monitored NOx emissions of the engine.

As also shown in FIG. 14A, high pressure air is funneled through the high pressure compressor manifold 1446 from the high pressure compressor 1432 to the intake manifold 1444. Hence, the intake manifold 1444 is maintained at a predetermined high pressure level dictated by the output of the high pressure compressor 1432. In order for the recirculated gases to flow through the EGR conduit 1438, the pressure in the high pressure manifold 1430 must be higher than the pressure in the intake manifold 1444, as dictated by the output pressure of the high pressure compressor 1432. In that regard, the valves in the high pressure exhaust ports 1406, 1408 are opened sufficiently early during the downstroke of the piston, when residual pressure still exists in the piston to create a sufficiently high pressure in the high pressure exhaust manifold 1430 to drive the exhaust gases from the high pressure exhaust manifold 1430 through the EGR conduit 1438. As disclosed below, the valves in the high pressure exhaust ports 1406, 1408 open at a point at which there is a small amount of energy loss in the process of driving the pistons downwardly. The opening point of the high pressure valves is prior to bottom dead center, but beyond the point of maximum torque of the piston on the crankshaft, which is the point at which the rods are at substantially 90°. This point occurs at approximately 100°. The amount of torque is proportional to the cosine of the angle of the rods, so that the lower the piston is when the high pressure valves open, the less energy that is lost in driving the pistons. However, there is a substantial amount of residual pressure left in the cylinder chamber, which can be exhausted from the cylinder chamber by the high pressure valves prior to reaching bottom dead center, that can be used to drive the exhaust gases in the EGR conduit 1438 into the high pressure turbine 1434. By pre-exhausting the cylinder, using the high pressure valves of the high pressure exhaust ports 1406, 1408, a large amount of the residual pressure in the cylinder is exhausted prior to opening of the low pressure exhaust ports 1410, 1412. When opened, the low pressure exhaust ports 1410, 1412 are capable of exhausting most of the pressure from the cylinders. In this manner, the residual pressure in the cylinders is used to channel exhaust gas through both the EGR conduit 1438, to reduce NOx emissions and to drive the high pressure turbine 1434, which adds additional power and efficiency to the engine.

As also shown in FIG. 14A, the exhaust gases from the low pressure exhaust manifold are used to drive a low pressure turbine 1420 of the low pressure superturbocharger 1402. Exhaust gases emitted by the high pressure turbine 1434 are combined with the low pressure exhaust gases from the low pressure exhaust ports 1410, 1412 to drive the low pressure turbine 1420. Exhaust gases from the low pressure turbine 1420 are exhausted by exhaust outlet 1436. The low pressure turbine 1420 is coupled to the low pressure compressor 1418, which compresses the inlet air 1422 by a predetermined amount. Low pressure super turbocharger compressor outlet 1490 is connected to conduit 1424, which channels the compressed air from the low pressure compressor 1418 to the high pressure super-turbocharger compressor air inlet 1492 of the high pressure compressor 1432, which functions to further compress the pressurized air in 1424 to produce higher pressure compressed air, which is channeled to the inlet manifold 1444 by high pressure compressor manifold 1446.

Figure 14B:
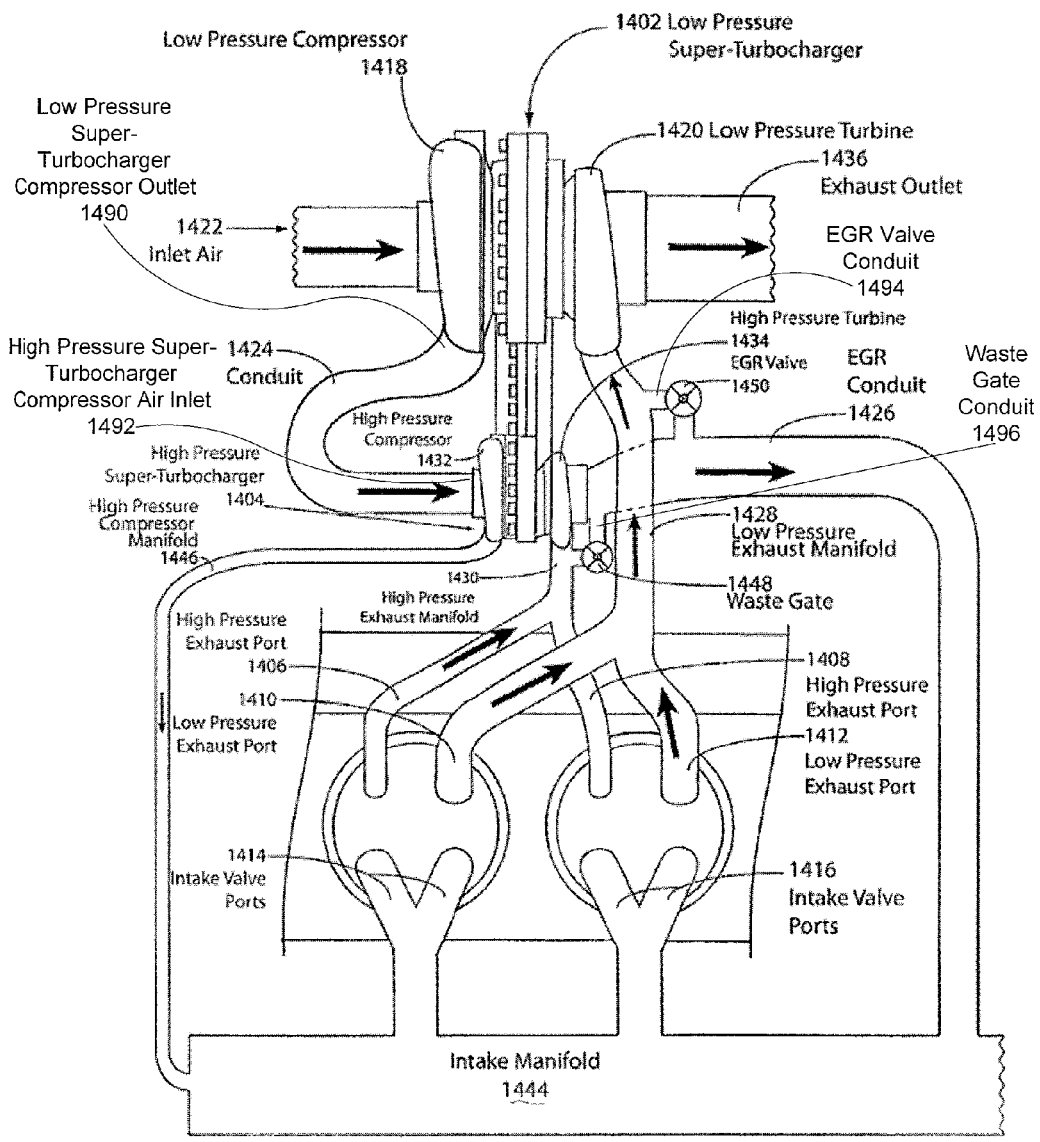
FIG. 14B is a schematic view of another embodiment of a super-turbocharged gas recirculation device.

FIG. 14B illustrates a variation of the embodiment illustrated in FIG. 14A. As illustrated in FIG. 14B, the high pressure exhaust ports 1406, 1408 are combined into a high pressure exhaust manifold that is coupled to the high pressure turbine 1434. In other words, all of the high pressure exhaust from the high pressure exhaust manifold 1430 is applied to the high pressure turbine 1434 to drive the high pressure turbine 1434, which in turn drives the high pressure compressor 1432. The high pressure compressor 1432 receives compressed air from the low pressure super-turbocharger compressor outlet 1490 via conduit 1424 from the low pressure compressor 1418 that compresses the inlet air 1422. The compressed air in conduit 1424 flows into the high pressure compressor 1432 via high pressure super-turbocharger compressor air inlet 1492. The output of high pressure compressor 1432 is fed to the input manifold 1444 via high pressure compressor manifold 1446. The low pressure compressor 1418 is driven by the low pressure turbine 1420 that is driven by the low pressure exhaust gases, in the low pressure exhaust manifold 1428, that are emitted by the low pressure exhaust ports 1410, 1412. Exhaust gases from the low pressure turbine 1420 are exhausted through exhaust outlet 1436. The high pressure gases from the high pressure exhaust manifold 1430, that drive the high pressure turbine 1434, are coupled to the exhaust gas recirculation (EGR) conduit 1426 and transmitted back to the intake manifold 1444. The high pressure gases from the high pressure exhaust manifold 1430, that drive the high pressure turbine 1434, are not substantially reduced in pressure and have a sufficiently high pressure to insert the exhaust gases from the EGR conduit 1426 into the intake manifold 1444. FIG. 14B provides the greatest reduction in NOx gases, since essentially all of the exhaust gases from the high pressure exhaust manifold 1430 are recirculated to the intake manifold 1444.

As also illustrated in FIG. 14B, a waste gate 1448 may be utilized to bypass high pressure exhaust gases from the high pressure exhaust manifold 1430 to the EGR conduit 1426 via the waste gate conduit 1496. The high pressure exhaust gases, at times, may be too hot and/or may provide exhaust gases at a pressure that will overdrive the high pressure turbine 1434. In that instance, the waste gate 1448 can be opened to feed a portion of the high pressure exhaust gas from the high pressure exhaust manifold 1430 directly to the EGR conduit 1426 via the waste gate conduit 1496. In addition, an EGR valve 1450 may be added, which connects the EGR conduit 1426 to the low pressure exhaust manifold 1428 via the EGR valve conduit 1494. If a sufficient amount of exhaust gases are being fed through the EGR conduit 1426, a portion of those gases may be directed from the EGR conduit 1426 to the low pressure exhaust manifold 1428 via EGR valve 1450 and EGR valve conduit 1494. The excess gases from the EGR conduit 1426 can then be used to run the low pressure turbine 1420 to add additional power to the engine by increasing the intake manifold pressure 1444. Use of the EGR valve 1450 provides an additional manner in which recirculated gases can be recovered to add additional power to the engine and increase the efficiency of the operation of the engine.

Figure 14C:
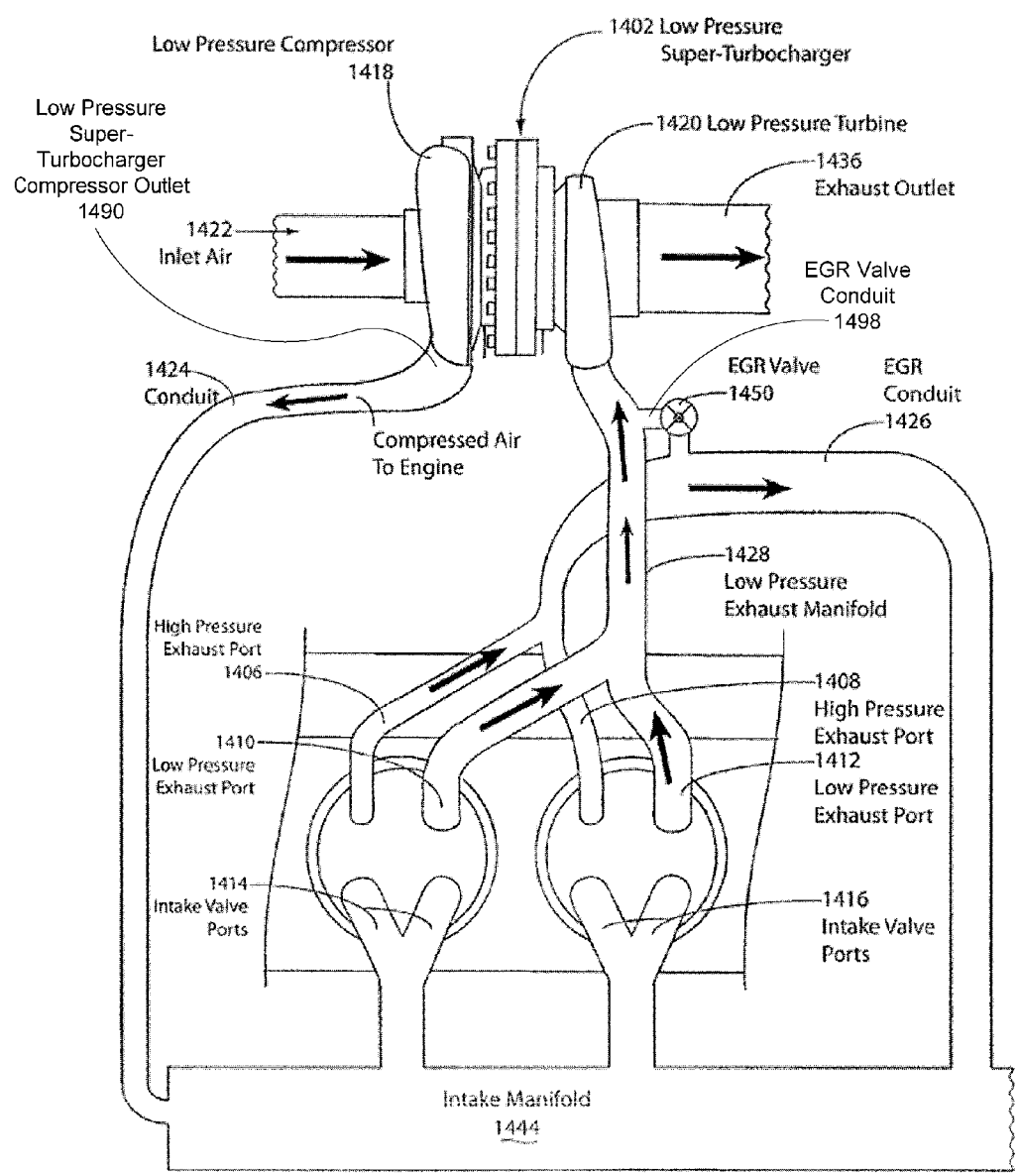
FIG. 14C is a schematic view of another embodiment of a super-turbocharged gas recirculation device.

FIG. 14C illustrates another modification of the embodiments of FIGS. 14A and 14B. As shown in FIG. 14C, inlet air 1422 is compressed by low pressure compressor 1418. The compressed air from the low pressure compressor 1418 at the low pressure-turbocharger compressor outlet 1490 is fed by conduit 1424 to the intake manifold 1444. As also illustrated in FIG. 14C, the second high pressure turbine is not utilized and all of the recirculation gas is recirculated from the high pressure exhaust ports 1406, 1408 via EGR conduit 1426 to the intake manifold 1444. Exhaust gases from the low pressure exhaust ports 1410, 1412 are combined in conduit 1428 to operate low pressure turbine 1420. The exhaust gases are then exhausted at exhaust outlet 1436. Hence, all of the blow down gases from the high pressure exhaust ports 1406, 1408 are fed back into the intake manifold 1444 to create a large reduction in NOx gases. Alternatively, an EGR valve 1450 can be used to channel a portion of the exhaust gases in the EGR conduit 1426 to the low pressure exhaust manifold 1428, via EGR valve conduit 1498 which adds further power to the low pressure turbine 1420 and reduces the amount of recirculated gases in the EGR conduit 1426. The EGR valve 1450 can be adjusted to adjust the amount of exhaust gases that are fed from the EGR conduit 1426 to the low pressure exhaust manifold 1428 via EGR valve conduit 1498. This process may be beneficial if a sufficient amount of exhaust gases are recirculated in the EGR conduit 1426 to reduce NOx output of the engine.

Figure 14D:
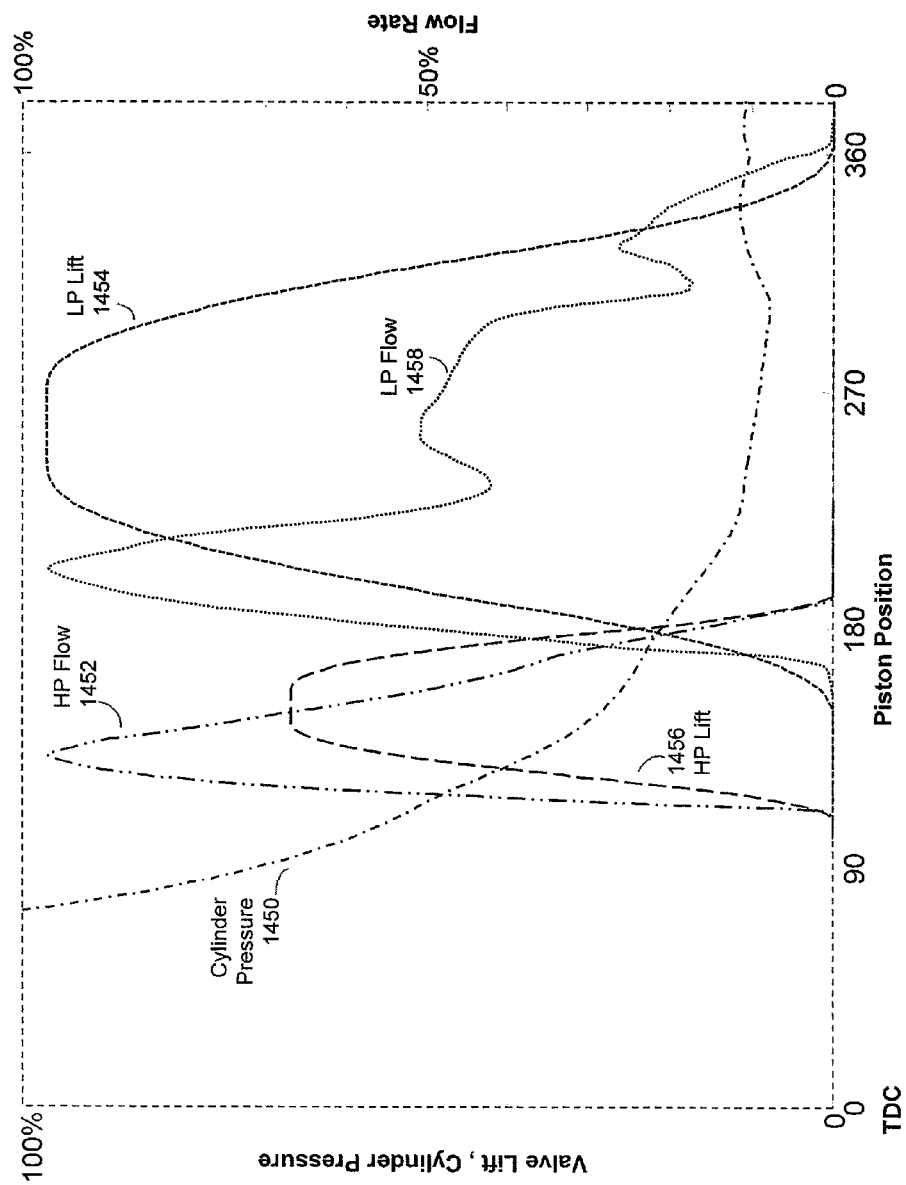
FIG. 14D is a graph of valve lift, flow rate and cylinder pressure versus piston position for the embodiments of FIGS. 14A-C.

FIG. 14D is a graph of the valve lift, cylinder pressure and flow rate versus the piston position after top dead center. As shown in FIG. 14D, the cylinder pressure 1450 steadily decreases after top dead center, all the way through the stroke of the piston. The lift of the high pressure valve 1456 creates the high pressure flow 1452. The lift of the high pressure valve 1456 occurs around 100° rotation and creates a large blow down surge of the high pressure flow 1452 that is exhausted through the high pressure exhaust ports 1406, 1408 (FIGS. 14A, 14B and 14C). The lift of the low pressure valve is illustrated at curve 1454. The low pressure valve lift creates the low pressure flow 1458 in the low pressure exhaust ports 1410, 1412. As a result, the cylinder pressure 1450 is further reduced in the cylinder.

Figure 14E:
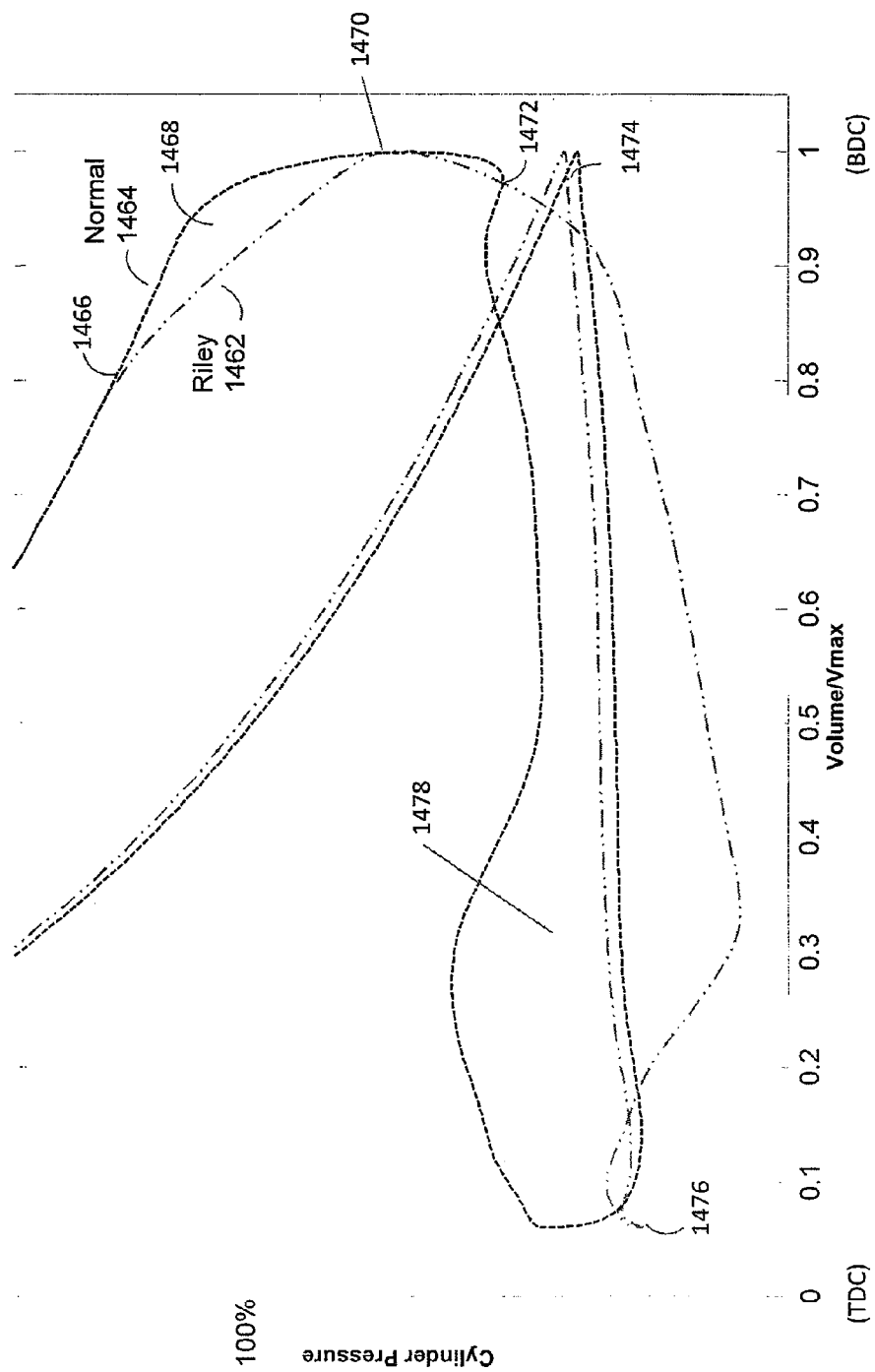
FIG. 14E is a PV graph of cylinder pressure versus cylinder volume for the embodiments of FIGS. 14A-C.

FIG. 14E is a PV graph of the cylinder pressure versus the volume in the cylinder, as the piston moves downwardly and then upwardly in the cylinder. Near zero represents the top dead center, while 1 represents the bottom dead center of the rotation of the cylinder. Two curves are shown in FIG. 14E. Curve 1464 represents the curve of the cylinder pressure versus the volume for an engine that does not employ the Riley cycle. Curve 1462 is a curve that illustrates the cylinder pressure versus volume in the cylinder for a Riley cycle device, such as illustrated in FIGS. 14A-C. At point 1466, the high pressure valve is opened on the Riley cycle device, as illustrated in FIGS. 14A-C, and the pressure is reduced. The area 1468, between points 1466, 1470, is representative of the energy lost by opening the high pressure valve. However, as indicated in FIG. 14E, at point 1472, the pressure in the Riley cycle device falls below the pressure in a non-Riley cycle device and remains below the pressure of the non-Riley cycle device all the way through to point 1474. Between 1472 and point 1474, there is less pressure in the cylinder, which results in less backpressure on the cylinder as the cylinder moves from point 1472 to point 1474. The large amount of area between the Riley cycle curve 1462 and the normal curve 1464, between points 1472 and 1476, as indicated by 1478, is indicative of the energy saved by movement of the piston in the cylinder at the lower pressure.

In an alternate embodiment, a super-turbocharger may be used as an air pump for after treatment, as well as for the engine and eliminates the need for a separate pump just for the burner.

In another embodiment, a governor (not shown) is provided to prevent over-speeding, keeping the compressor out of a surge condition and controlling to the maximum efficiency of the turbine and compressor. A super-turbocharger can be unique from a normal turbocharger because the peak of the turbine efficiency and the peak of the compressor efficiency can be at the same speed. Controlling to this peak efficiency speed for a given boost requirement can be modeled and programmed into an electronic governor. An actuator can provide governing, although an actuator is not needed for the electric transmission.

In another embodiment, the oiling system for the super-turbocharger pulls a vacuum inside the housing, and therefore reduces aerodynamic losses of the high speed components.

In another alternate embodiment, a dual clutch super-turbocharger includes an automatically shifted manual transmission. This type of transmission shifts very smoothly because it has a clutch on both ends. FIG. 3C illustrates that the transmission could be of many different types.

Figure 15:
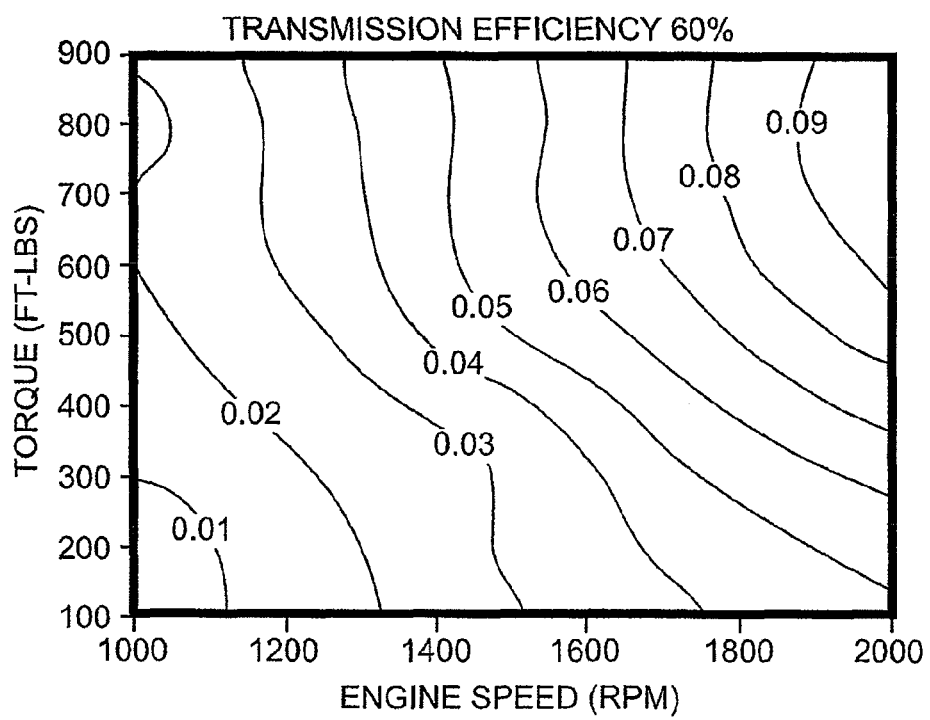
FIG. 15 is a graphical illustration of simulated BSFC improvement.

In another embodiment, traction drives for both the transmission and the speed reduction from the turbo shaft are used. With ball bearings, the traction fluid works as the lubricant as well. During supercharging, the system improves load acceptance, reduces soot emissions, provides up to 30% increase in low end torque and up to 10% increase in peak power. During turbo-compounding, the system provides improved fuel economy of up to 10% and controls backpressure. For engine downsizing, the system provides 30% more low end torque that allows the engine to be 30 to 50% smaller, having lower engine mass and improved vehicle fuel economy of 17% or more. FIG. 15 illustrates the simulated BSFC improvement for a natural gas engine.

Also, a catalyst, a DPF or even a burner plus DPF can be positioned in front of the turbine of the super-turbocharger to heat the exhaust gas to a higher temperature than the heat of the engine. Higher temperatures expand the air even further making the flow rate across the turbine higher. Approximately 22% of this heat addition can be turned into mechanical work across the super-turbocharger, assuming 80% turbine efficiency. Normally, higher volume in the exhaust that is fed to the turbine would slow the turbine response and create even bigger turbo lag, but the super-turbocharger overcomes this problem with the traction drive 114 and continuously variable transmission 116 driving the pressure response. Similar techniques using a catalytic converter are disclosed in International Patent Application No. PCT/US 2009/051742 filed 24 Jul. 2009 by Van Dyne et al. entitled "Improving Fuel Efficiency for a Piston Engine Using a Super-Turbocharger" which is specifically incorporated herein by reference for all that it discloses and teaches.

Figure 16:
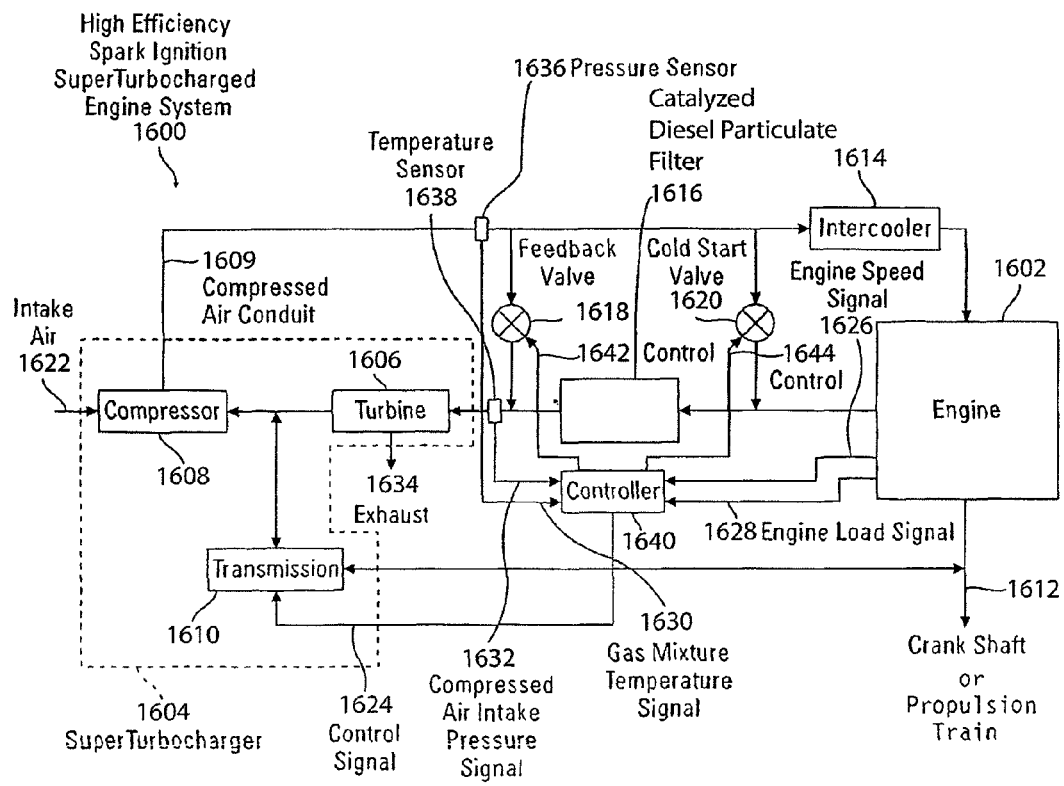
FIG. 16 is a simplified single line form illustration of one embodiment of a high efficiency, super-turbocharged engine system.

FIG. 16 is a simplified single line form illustration of one embodiment of a high efficiency, super-turbocharged engine system 1600. As will become apparent to those skilled in the art from the following description, such a super-turbocharged engine system 1600 finds particular applicability in diesel engines and some spark ignited, gasoline engines that are used in passenger and commercial vehicles, and therefore the illustrative examples discussed herein utilize such an environment to aid in the understanding of the invention. However, recognizing that embodiments of system 1600 have applicability to other operating environments such as, for example, land based, power generation engines, and other land based engines, such examples should be taken by way of illustration and not by way of limitation.

As shown in FIG. 16, the super-turbocharger 1604 includes a turbine 1606, a compressor 1608, and a transmission 1610 that is coupled to the crank shaft 1612 of the engine 1602 or other portions of the propulsion train. While not required in all embodiments, the illustrated embodiment of FIG. 16 also includes an intercooler 1614 to increase the density of the air supplied to the engine 1602 from the compressor 108 to further increase the power available from the engine 1602.

Super-turbochargers have certain advantages of turbochargers. A turbocharger utilizes a turbine that is driven by the exhaust of the engine. This turbine is coupled to a compressor which compresses the intake air that is fed into the cylinders of the engine. The turbine in a turbocharger is driven by the exhaust from the engine. As such, the engine experiences a lag in boost when first accelerated until there is enough hot exhaust to spin up the turbine to power a compressor, which is mechanically coupled to the turbine, to generate sufficient boost. To minimize lag, smaller and/or lighter turbochargers are typically utilized. The lower inertia of the lightweight turbochargers allows them to spin up very quickly, thereby minimizing the lag in performance.

Unfortunately, such smaller and/or lighter weight turbochargers may be over-sped during high engine speed operation when a great deal of exhaust flow and temperature is produced. To prevent such over speed occurrences, typical turbochargers include a waste gate valve that is installed in the exhaust pipe upstream of the turbine. The waste gate valve is a pressure operated valve that diverts some of the exhaust gas around the turbine when the output pressure of the compressor exceeds a predetermined limit. This limit is set at a pressure that indicates that the turbocharger is about to be oversped. Unfortunately, this results in a portion of the energy available from the exhaust gases of the engine being wasted.

Recognizing that conventional turbochargers sacrifice low end performance for high end power, devices known as super-turbochargers were developed. One such super-turbocharger is described in U.S. Pat. No. 7,490,594 entitled "Super-Turbocharger," issued Feb. 17, 2009, which is specifically incorporated herein by reference for all that it discloses and teaches.

As discussed in the above-referenced application, in a super-turbocharger the compressor is driven by the engine crank shaft via a transmission that is coupled to the engine during low engine speed operation when sufficiently heated engine exhaust gas is not available to drive the turbine. The mechanical energy supplied by the engine to the compressor reduces the turbo lag problem suffered by conventional turbochargers, and allows for a larger or more efficient turbine and compressor to be used.

The super-turbocharger 1604, illustrated in FIG. 16, operates to supply compressed air from the compressor 1608 to the engine 1602 without suffering from the turbo-lag problem of a conventional turbocharger at the low end and without wasting energy available from the engine exhaust gas heat supplied to the turbine 1606 at the high end. These advantages are provided by inclusion of the super-turbocharger transmission 1610 that can both extract power from, and supply power to, the engine crank shaft 1612 to both drive the compressor 1608 and load the turbine 1606, respectfully, during various modes of operation of the engine 1602.

During start up, when conventional turbochargers suffer a lag due to the lack of sufficient power from the engine exhaust heat to drive the turbine, the super-turbocharger 1604 provides a supercharging action whereby power is taken from the crank shaft 1612 via the super-turbocharger transmission 1610 to drive the compressor 1608 to provide sufficient boost to the engine 1602. As the engine comes up to speed and the amount of power available from the engine exhaust gas heat is sufficient to drive the turbine 1606, the amount of power taken from the crank shaft 1612 by the transmission 1610 is reduced. Thereafter, the turbine 1606 continues to supply power to the compressor 1608 to compress the intake air for use by the engine 1602.

As the engine speed increases, the amount of power available from the engine exhaust gas heat increases to the point where the turbine 1606 would over speed in a conventional turbocharger. However, with the super-turbocharger 1604, the excess energy provided by the engine exhaust gas heat to the turbine 1606 is channeled through the transmission 1610 to the engine crank shaft 1612 while maintaining the compressor 1608 at the proper speed to supply the ideal boost to the engine 1602. The greater the output power available from the exhaust gas heat of the engine 1602, the more power generated by the turbine 1606 that is channeled through the transmission 1610 to the crank shaft 1612 while maintaining the optimum boost available from the compressor 1608. This loading of the turbine 1606 by the transmission 1610 prevents the turbine 1606 from over speeding and maximizes the efficiency of the power extracted from the engines exhaust gases. As such, a conventional waste gate is not required.

While the amount of power available to drive the turbine 1606 in a conventional super-turbocharged application is limited strictly to the amount of power available from the engine exhaust, the turbine 1606 is capable of generating significantly more power if the thermal energy and mass flow supplied to the turbine blades can be fully utilized and/or can be increased. However, the turbine 1606 cannot operate above a certain temperature without damage, and the mass flow is conventionally limited to the exhaust gases coming out of the engine 1602.

Recognizing this, the embodiment of the system 1600 protects the turbine 1606 from high temperature transients by placing a catalyzed diesel particulate filter 1616 upstream of the turbine 1606. In one embodiment, the catalyzed diesel particulate filter is placed upstream from the turbine near the exhaust manifold which enables exothermic reactions that result in an increase in exhaust gas temperature during sustained high speed or load operation of the engine. Using a catalyzed digital particulate filter, energy can be recovered from the soot, hydrocarbons and carbon monoxide that is burned on the catalyzed diesel particulate filter 1616 to add power to the super turbo charger which is located downstream from the catalyzed digital particulate filter 1616. Energy recovery can be achieved from either a conventional diesel particulate filter that has a very restricted flow-through capacity, with nearly 100% soot collection, or by using a flow-through catalyzed digital particulate filter. A flow-through catalyzed digital particulate filter is a diesel particulate filter that only collects about half of the soot and lets the other half pass through. Both types of digital particulate filters are catalyzed in order to have emissions burn at a reasonably low temperature. Catalyzing of the digital particulate filter is accomplished by providing a platinum coating to the particulate filter elements that ensures that soot, hydrocarbons and carbon monoxide burn at low temperatures. Additionally, it is possible to use a diesel particulate filter and a burner to burn the soot off of the digital particulate filter upstream from the super-turbocharger. Gasoline engines typically do not have enough soot to require a diesel particulate filter. However, some gasoline direct injection engines produce sufficient soot and other particulates so that the use of a particulate filter may be beneficial, and the use of a catalyzed diesel particulate filter may be deployed in the manner disclosed herein.

To cool the exhaust gas, prior to reaching the turbine, a portion of the compressed air generated by the compressor is fed directly into the exhaust upstream from the turbine, via a control valve 1618, and added to the engine exhaust gases leaving the catalyzed diesel particulate filter 1616. The cooler intake air expands and cools the exhaust gas and adds additional mass to the exhaust gas flow, which adds additional power to the turbine 1606 as described in more detail below. As more cooler air is provided to the hot exhaust gases to maintain the temperature of the combined flow to the turbine 1606 at the optimum temperature, the energy and the mass flow that is delivered to the turbine blades also increases. This significantly increases the power supplied by the turbine to drive the engine crank shaft.

So as to not interfere with the stoichiometric reaction within the catalyzed diesel particular filter 1616, the compressor feedback air is added downstream of the catalyzed diesel particulate filter 1616. In such an embodiment, the engine exhaust gas is passed through the catalyzed diesel particulate filter 1616 and temperature of the exhaust gas is increased by the exothermic reaction. The compressed feedback air is then added and expands so that the total mass flow supplied to the turbine is increased. Embodiments of the present invention control the amount of compressed feedback air supplied to cool the exhaust and to drive the turbine to ensure that the combination of the cooler compressed feedback air and the engine exhaust gases are delivered to the turbine at an optimum temperature for turbine blade operation.

Since the catalyzed diesel particulate filter 1616, illustrated in FIG. 16, has a large thermal mass than the exhaust gases from engine 1602, the catalyzed diesel particulate filter 1616 operates as a thermal damper initially, which prevents a high temperature thermal spike from reaching the turbine 1606. However, since the reactions in the catalyzed diesel particulate filter 1616 are exothermic in nature, the temperature of the exhaust gases leaving the catalyzed diesel particulate filter 1616 are higher than that of the exhaust gas entering the catalyzed diesel particulate filter 1616. So long as the temperature of the exhaust gas entering the turbine remains below the maximum operating temperature of the turbine 1606, there is no problem.

However, during sustained high speed and high load operation of the engine 1602, the exit temperatures of the converted exhaust gas from catalyzed diesel particulate filter 1616 can exceed the maximum operating temperature of turbine 1606. As set forth above, the temperature of the exhaust gases exiting the catalyzed diesel particulate filter 1616 are reduced by supplying a portion of the compressed air from the compressor 1608 via a feedback valve 1618, and mixed with the exhaust gas exiting the catalyzed diesel particulate filter 1616. Significantly improved fuel economy is achieved by not using fuel as a coolant during such conditions, as is done in conventional systems. Additionally, the operation of the transmission is controlled to allow the compressor 1608 to supply a sufficient amount of compressed air to provide optimum boost to the engine 1602 and the compressed feedback air to the turbine 1606 via the feedback valve 1618. The excess power generated by the turbine 1606 resulting from the increased mass flow of the compressed air through the turbine is channeled via the transmission 1610 to the crank shaft 1612, yet further increasing fuel efficiency.

The output temperature of the compressed air from the compressor 1608 is typically between about 200° C. to 300° C. A conventional turbine can operate optimally to extract power from gases at approximately 950° C., but not higher without distortion or possible failure. Because of the material limits of the turbine blades, the optimal power is achieved at approximately 950° C. Since the materials limit the exhaust gas temperatures to about 950° C., supplying more air to increase the mass flow across the turbine at the temperature limit, e.g., 950° C., increases the performance of the turbine.

While such a flow of compressed feedback air at 200° C. to 300° C. is helpful in reducing the temperature of the exhaust gas coming out of the catalyzed diesel particulate filter 1616, it is recognized that maximum power from the turbine 1606 can be supplied when the temperature and the mass flow is maximized within the thermal limits of the turbine 1606. As such, in one embodiment, the amount of feedback air is controlled so that the combination of exhaust gas and feedback air is maintained at or near the turbine's maximum operating temperature so that the amount of power delivered to the turbine is maximized or significantly increased. Since all of this excess power is normally not required by the compressor 1608 to supply the optimum boost to engine 1602 and to supply the compressor feedback air via feedback valve 1618, the excess power may be transferred by the transmission 1610 to the crank shaft 1612 of the engine 1602 to thereby increase the overall efficiency or power of the engine 1602.

As discussed above, in one embodiment, the connection of the compressor feedback air via feedback valve 1618 employs a catalyzed diesel particulate filter 1616 as the thermal buffer between the engine 1602 and turbine 1606. As such, the supply of air from the compressor is provided downstream of the catalyzed diesel particulate filter 1616 so as to not disrupt the stoichiometric reaction within the catalyzed diesel particulate filter 1616. That is, in embodiments that utilize a catalyzed diesel particulate filter 1616, supplying the compressor feedback air upstream of the catalyzed diesel particulate filter 1616 would result in excess oxygen being supplied to the catalyzed diesel particulate filter 1616, thereby preventing the catalyzed diesel particulate filter 1616 from generating a stoichiometric reaction that is required for proper operation.

Since optimum efficiency of power generation by the turbine 1606 is achieved when the temperature of the gas mixture of the compressor feedback air and exhaust gas on the turbine blades is maximized (within the material limits of the turbine itself), the amount of compressor feedback air admitted by the feedback valve 1618 is limited so as to not reduce the temperature significantly below such an optimized temperature. As the catalyzed diesel particulate filter 1616 produces more thermal energy via an exothermic reaction and the temperature of the converted exhaust gases from the catalyzed diesel particulate filter 1616 increases to a temperature above the maximum operating temperature of the turbine 1606, more compressor feedback air may be supplied via feedback valve 1618 which increases the mass flow and energy supplied to the turbine 1606. As the amount of thermal energy generated by catalyzed diesel particulate filter 1616 is reduced, the amount of compressor feedback air supplied by feedback valve 1618 can also be reduced so as to avoid supplying more air than necessary, which results in the maintenance of the temperature of the gas mixture at the optimum operating condition.

In another embodiment, the system utilizes the feedback valve 1618 for feeding back the cooler compressor air into the exhaust ahead of the turbine at low speed, high load operating conditions to avoid surging the compressor. Compressor surge occurs when the compressor pressure gets high but the mass flow allowed into the engine is low as a result of the engine turning at a slow rpm and not requiring much intake air flow. Surging (or aerodynamic stalling) of the compressor resulting from low airflow across the compressor blades causes the efficiency of the compressor to fall very rapidly. In the case of a normal turbocharger, enough surge can stop the turbine from spinning. In the case of a super-turbocharger it is possible to use power from the engine crank shaft to push the compressor into surge. Opening the feedback valve 1618 allows a portion of the compressed air to feedback around the engine. This feedback flow brings the compressor out of surge and allows higher boost pressure to reach the engine 1602, thereby allowing the engine 1602 to generate more power than would normally be possible at low engine speeds. Injecting the compressed air into the exhaust ahead of the turbine conserves the total mass flow through the compressor so that all the flow reaches the turbine which minimizes the power needed from the engine to supercharge to a high boost pressure level.

In another embodiment, an additional cold start control valve 1620 may be included for operation during rich engine cold starts. During such an engine cold start, the exhaust gases from the engine 1602 typically include excess un-burnt fuel. Since this rich mixture is not stoichiometric, the catalyzed diesel particulate filter 1616 is unable to fully reduce the un-burnt hydrocarbons (UHC) in the exhaust gas. During such times, the cold start control valve 1620 may be opened to provide compressor feedback air to the input of the catalyzed diesel particulate filter 1616 to supply the extra oxygen necessary to bring the rich mixture down to stoichiometric levels. This allows the catalyzed diesel particulate filter 1616 to light off faster and more efficiently reduce the emissions during the cold start event. If the engine is idling, a normal turbocharger would have no boost pressure to be able to supply the feedback air. However, the transmission ratio of transmission 1610 can be adjusted to give enough speed to the compressor to generate the pressure needed for the air to flow through valve 1620. In that regard, control signal 1624 can be used to adjust the ratio of transmission 1610 so that sufficient rotational speed can be provided from the engine drive shaft 1612 to the compressor 1608 during idling, especially during a cold start, to compress enough air to flow through the cold start valve 1620 and ignite catalyzed diesel particulate filter 1616 with a sufficient amount of oxygen.

The requirement for the additional oxygen is typically limited in a cold start event, and often lasts only for 30 to 40 seconds. Many vehicles currently include a separate air pump to supply this oxygen during the cold start event, at significant cost and weight compared to the limited amount of time that such an air pump is required to operate. By replacing the separate air pump with the simple cold start control valve 1620, significant costs, weight and complexity savings are realized. Because the super-turbocharger 1604 can control the speed of the compressor 1608 via the transmission 1610, the cold start control valve 1620 may comprise a simple on/off valve. The amount of air supplied during the cold start event can then be controlled by controlling the speed of the compressor 1608 via transmission 1610 under operation of the control signal 1624.

The cold start control valve 1620 may also be used during periods of extremely high temperature operation if fuel is used as a coolant within the engine and/or for the catalyzed diesel particulate filter 1616, despite the negative effect on fuel efficiency. In such situations, the cold start control valve 1620 will be able to supply the extra oxygen necessary to bring the rich exhaust back down to stoichiometric levels to allow the catalyzed diesel particulate filter 1616 to properly reduce the unburned hydrocarbon emissions in the exhaust. This provides a significant benefit to the environment over prior systems.

In embodiments where the cold start control valve 1620 is an on/off valve, the system can modulate cold start control valve 1620 to vary the amount of compressed air supplied so as to bring the exhaust down to stoichiometric levels. Other types of variable flow control valves may also be used to accomplish this same function.

FIG. 16 also discloses a controller 1640. Controller 1640 controls the operation of the feedback valve 1618 and the cold start valve 1620. Controller 1640 operates to optimize the amount of air flow through feedback valve 1618 for different conditions. The amount of air that flows through the feedback valve 1618 is the minimal amount of air flow that is necessary to obtain a specific desired condition, as described above. There are two specific conditions in which controller 1640 operates feedback valve 1618, which are: 1) surge limit of the compressor for a given boost requirement is proximate at low rpm, high load of the engine; and, 2) temperature of the gas mixture is proximate entering the turbine 1606 at high rpm, high load conditions.

As shown in FIG. 16, controller 1640 receives the gas mixture temperature signal 1630 from a temperature sensor 1638 that detects the temperature of the gas mixture of the cooling air supplied from the compressor 1608 that is mixed with the hot exhaust gases produced by the catalyzed diesel particulate filter 1616. In addition, the controller 1640 detects the compressed air intake pressure signal 1632 that is generated by the pressure sensor 1636 that is disposed in the conduit of compressed air that is supplied from the compressor 1608. Further, an engine speed signal 1626 and an engine load signal 1628 that are supplied from the engine 1602 or a throttle are fed to the controller 1640.

With respect to control of the temperature of the gas mixture that is supplied to the turbine 1606 at high speed, high load conditions, controller 1640 limits the temperature of the gas mixture to a temperature that maximizes the operation of the turbine 1606, without being so high as to damage the mechanisms of the turbine 1606. In one embodiment, a temperature of approximately 925° C. is an optimal temperature for the gas mixture to operate the turbine 1606. Once the temperature of the gas mixture that is fed into the turbine 1606 begins to exceed 900° C., the feedback valve 1618 is opened, to allow compressed air from the compressor 1608 to cool the hot exhaust gases from the catalyzed diesel particulate filter 1616 prior to passing into the turbine 1606. The controller 1640 can be designed to target a temperature of approximately 925° C., with an upper bound of 950° C. and a lower bound of 900° C. The limit of 950° C. is one at which damage to the turbine 1606 may occur using conventional materials. Of course, the controller can be designed for other temperatures, depending upon the particular types of components and materials used in the turbine 1606. A conventional proportional integral derivative (PID) control logic device can be used in the controller 1640 to produce these controlled results.

The benefit of controlling the temperature of the gas mixture that enters the turbine 1606 is that the use of fuel in the exhaust to limit the turbine inlet temperatures of the gas mixture is eliminated. Using the flow of the cooler compressed air to cool the hot exhaust gases from the catalyzed diesel particulate filter 1616 requires a large amount of air, which contains a large mass to achieve the desired cooler temperatures of the gas mixture. The amount of air that is required to cool the hot exhaust gases from the catalyzed diesel particulate filter 1616 is large because the cooler compressed air from the compressor 1608 is not a good coolant, especially when compared to liquid fuel that is inserted in the exhaust gas. The hot exhaust gases from the output of the catalyzed diesel particulate filter 1616 cause the cooler compressed gas from the compressor 1608 to expand to create the gas mixture. Since a large mass of the cooler compressed air from the compressor 1608 is required to lower the temperature of the hot exhaust gases from the catalyzed diesel particulate filter 1616, a large mass flow of the gas mixture flows across the turbine 1606, which greatly increases the output of the turbine 1606. The turbine power increases by the difference of the power created by the differential of the mass flow minus the work required to compress the compressed air flowing through the feedback valve 1618. By obtaining the gas mixture temperature signal 1630 from temperature sensor 1638 and controlling the addition of compressed air by feedback valve 1618, the maximum temperature is not exceeded.

Controller 1640 also controls the feedback valve 1618 to limit surge in the compressor 1608. The surge limit is a boundary that varies as a function of the boost pressure, the flow of air through the compressor and the design of the compressor 1608. Compressors, such as compressor 1608, that are typically used in turbochargers, exceed a surge limit when the flow of intake air 1622 is low and the pressure ratio between the intake air 1622 and the compressed air is high. In conventional super-turbochargers, the flow of intake air 1622 is low when the engine speed (rpm) 1626 is low. At low rpms, when the compressed air is not used in large volumes by the engine 1602, the mass flow of intake air 1622 is low and surge occurs because the rotating compressor 1608 cannot push air into a high pressure conduit without a reasonable flow of intake air 1622. The feedback valve 1618 allows flow through the compressed air conduit 1609 and prevents or reduces surge in the compressor 1608. Once surge in the compressor 1608 occurs, the pressure in the compressed air conduit 1609 cannot be maintained. Hence, at low rpm, high load operating conditions of the engine 1602, the pressure of the compressed air in the compressed air conduit 1609 may drop below desired levels. By opening the feedback valve 1618, the flow of intake air 1622 through the compressor 1608 is increased, especially at low rpm, high load operating conditions of the engine, which allows the desired level of boost to be achieved in the compressed air conduit 1609. Feedback valve 1618 can simply be opened until the desired pressure in the compressed air conduit 1609 is reached. However, by simply detecting boost pressure in the compressed air conduit 1609, surge will occur prior to the feedback valve 1618 being opened to bring the compressor 1608 out of a surge condition.

It is preferable, however, to determine a surge limit and open the feedback valve 1618 in advance, prior to the occurrence of a surge condition. For a given rpm and desired boost level a surge limit can be determined. The feedback valve 1618 can begin to open prior to the compressor 1608 reaching a calculated surge limit. Opening the valve early allows the compressor to spool up to a higher boost pressure more quickly because the compressor stays closer to the higher efficiency points of the compressor operational parameters. Rapid boost pressure rise at low rpm can then be achieved. By opening the valve before surge occurs, a more stable control system can also be achieved.

Opening the feedback valve 1618 in such a way as to improve the responsiveness of the engine 1602, is achieved by allowing the engine 1602 to get to a higher boost pressure more quickly when the engine 1602 is at a lower rpm. Compressor 1608 is also more efficient, which results in less work for the transmission 1610 to achieve supercharging. Surge limit control can be modeled within standard model based control simulation code, such as MATLAB. Modeling in this manner will allow simulation of the controller 1640 and autocoding of algorithms for controller 1640.

A model based control system, such as described above, is unique, in that the utilization of the transmission 1610 to control the rotation of the turbine 1606 and compressor 1608 generates boost pressure without turbo lag. In other words, the transmission 1610 can extract rotational energy from the crank shaft 1612 to drive the compressor 1608 to achieve a desired boost in compressed air conduit 1609 very quickly and prior to the turbine 1606 generating sufficient mechanical energy to drive the compressor 108 at such a desired level. In this manner, controls in a conventional turbocharger to reduce lag are reduced or eliminated. The model based control of the controller 1640 should be designed to maintain the optimum efficiency of the compressor 1608 within the operational parameters of the compressor 108.

The control model of controller 1640 should also be carefully modeled on the pressure operational parameters, as mapped against the mass flow allowed by the engine for a given target speed and load in which target speed and load may be defined relative to the position of the throttle of the vehicle. As shown in FIG. 16, the engine speed signal 1626 can be obtained from engine 1602 and is applied to the controller 1640. Similarly, the engine load signal 1628 can be obtained from the engine 1602 and applied to controller 1640.

Alternatively, these parameters can be obtained from a sensors located on the engine throttle (not shown). The feedback valve 1618 can then be operated in response to a control signal 1642 generated by controller 1640. Pressure sensor 1636 generates the compressed air intake pressure signal 1632 that is applied to the controller 1640, which calculates the control signal 1642 in response to engine speed signal 1626, engine load signal 1628 and compressed air intake pressure signal 1632.

During operational conditions of the engine 1602, in which a surge limit is not being approached by the compressor 1608 and the temperature of the gas mixture, as detected by the temperature sensor 1638, is not reached, the feedback valve 1618 is closed so that the system works as a conventional super-turbocharged system. This occurs over a majority of the operating parameters of the engine 1602. When high load and low rpm conditions of the engine 1602 occur, the feedback valve 1618 is opened to prevent surge. Similarly, at high rpm, high load operating conditions of engine 1602, high temperatures are produced in the exhaust gases at the output of the catalyzed diesel particulate filter 1616, so that the feedback valve 1618 must be opened to reduce the temperature of the fuel mixture applied to the turbine 1606 below a temperature which would cause damage to the turbine 1606.

Figure 17:
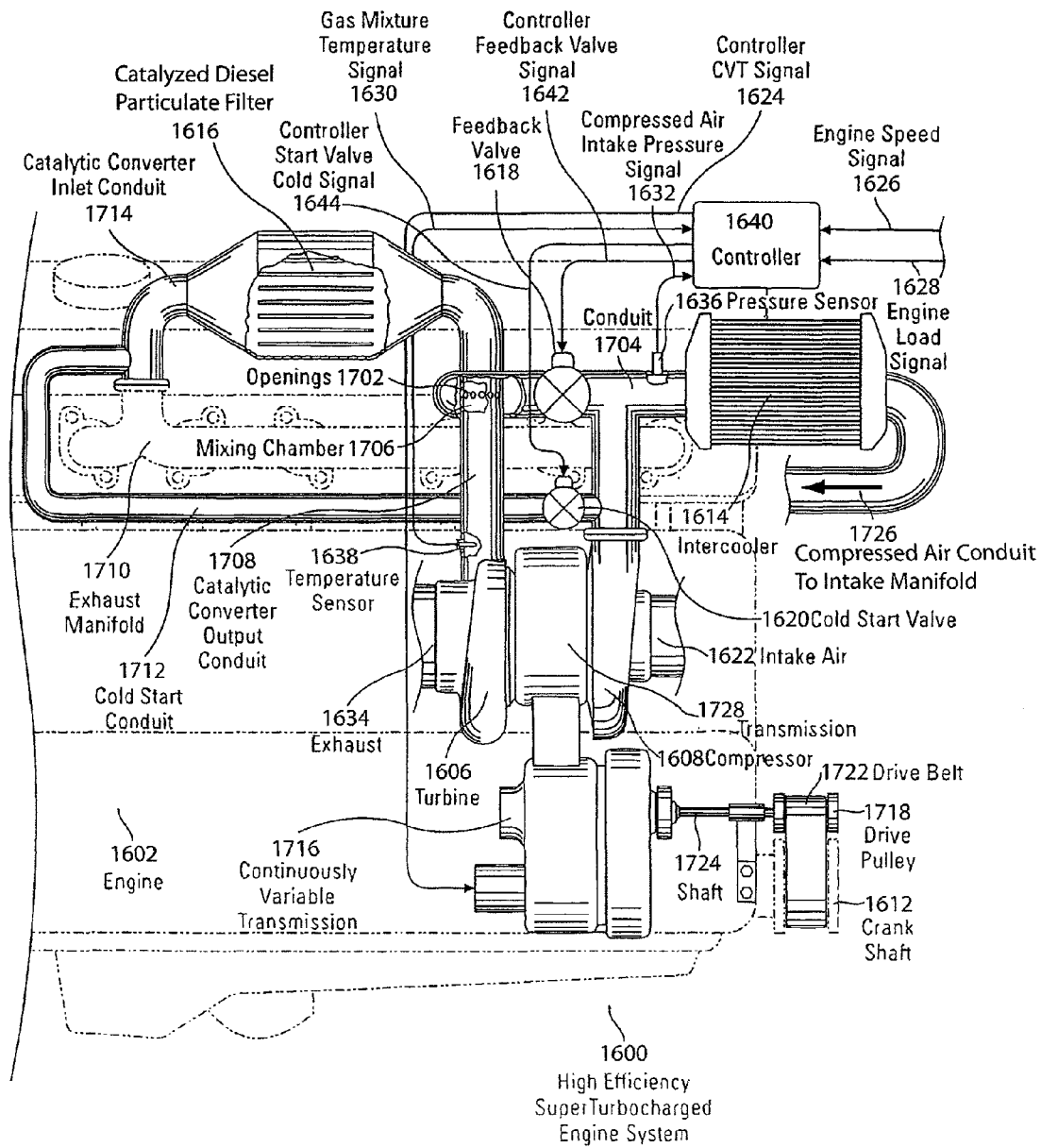
FIG. 17 is a detailed diagram of the embodiment of the high efficiency super-turbocharged engine system of FIG. 16.

FIG. 17 is a detailed diagram of the embodiment of the high efficiency super-turbocharged engine system 1600 illustrated in FIG. 16. As shown in FIG. 17, engine 1602 includes a super-turbocharger that has been modified, as described above with respect to FIG. 16, to provide overall higher efficiency than conventional super-turbocharged engines, as well as providing high, optimal efficiency in low rpm, high load operating conditions, and high, optimal efficiency at high rpm, high load conditions. The super-turbocharger includes a turbine 1606 that is mechanically connected by a shaft to compressor 1608. Compressor 1608 compresses intake air 1622 and supplies the compressed intake air to conduit 1704. Conduit 1704 is connected to feedback valve 1618 and intercooler 1614. As disclosed above, intercooler 1614 functions to cool the compressed air, which becomes heated during the compression process. The intercooler 1614 is connected to the compressed air conduit 1726 which, in turn, is connected to the intake manifold (not shown) of the engine 1602. Pressure sensor 1636 is connected to the compressed air conduit 1704 to detect the pressure and supply a pressure reading via the compressed intake air pressure signal 1632, which is applied to controller 1640. The feedback valve 1618 is controlled by a controller feedback valve control signal 1642 generated by the controller 1640, as disclosed above. Under certain operating conditions, feedback valve 1618 opens to supply compressed air from compressed air conduit 1704 to a mixing chamber 1706.

As shown in the embodiment of FIG. 17, the mixing chamber 1706 simply comprises a series of openings 1702 in the catalyzed diesel particulate filter output conduit 1708, which is surrounded by the compressed air conduit 1704 so that compressed air supplied from the compressed air conduit 1704 passes through the openings 1702 to mix with the exhaust gases in the catalyzed diesel particulate filter output conduit 1708. Any desired type of mixing chamber can be used to mix the cooler compressed air with the exhaust gases to lower the temperature of the exhaust gases. Temperature sensor 1638 is located in the catalyzed diesel particulate filter output conduit 1708 to measure the temperature of the exhaust gases in the catalyzed diesel particulate filter output conduit 1708. Temperature sensor 1638 supplies a gas mixture temperature signal 1630 to controller 1640, which controls the feedback valve 1618 to ensure that the temperature of the exhaust gases in the catalyzed diesel particulate filter output conduit 208 do not exceed a maximum temperature that would damage to the turbine 1606. Catalyzed diesel particulate filter 1616 is connected to the exhaust manifold 1710 by way of catalyzed diesel particulate filter inlet conduit 1714. By locating the catalyzed diesel particulate filter 1616 proximate to the exhaust manifold 1710, the hot exhaust gases from the engine flow directly into the catalyzed diesel particulate filter 1616, which assists in activating the catalyzed diesel particulate filter 1616. In other words, the proximate location of the catalyzed diesel particulate filter 1616 near the outlet of the engine exhaust gases does not allow the exhaust gases to cool substantially prior to entering the catalyzed diesel particulate filter 1616, which increases the performance of the catalyzed diesel particulate filter 1616. As the exhaust gases pass through the catalyzed diesel particulate filter 1616, the catalyzed diesel particulate filter 1616 adds additional heat to the exhaust gases. These very hot exhaust gases at the output of the catalyzed diesel particulate filter 1616 are supplied to the catalyzed diesel particulate filter output conduit 208 and are cooled in the mixing chamber 1706 with the compressed intake air from the compressed air conduit 1704. Depending upon the temperature of the very hot exhaust gases that are produced at the output of the catalyzed diesel particulate filter 1616, which varies depending upon the operating conditions of the engine 1602, a different amount of compressed intake air will be added to the exhaust gas during high speed, high load conditions. During low engine speed, high engine load conditions, the feedback valve 1618 also functions to allow intake air to flow through the compressor to avoid surge. Surge is similar to aerodynamic stall of the compressor blades, which occurs as a result of the low flow conditions through the compressor during low engine speed conditions. When surge occurs, the pressure in the intake manifold (not shown) falls because the compressor 1608 is unable to compress the intake air. By allowing air to flow through the compressor 1608 as a result of the feedback valve 1618 being opened, pressure can be maintained in the intake manifold so that, when high torque is required at low engine speeds, the high torque can be achieved because of the high intake manifold pressure.

As disclosed above, when the engine is operating under high speed, high load conditions, the catalyzed diesel particulate filter 1616 causes a large amount of heat to be generated in the exhaust gases that are supplied to the catalyzed diesel particulate filter output conduit 1708. By supplying compressed, cooler intake air to the catalyzed diesel particulate filter output conduit 1708, the hot exhaust gases under high speed, high load conditions are cooled. As the load and speed of the engine increases, hotter gases are produced and more of the compressed air from conduit 1704 is required. If the turbine 1606 does not provide sufficient rotational energy to drive the compressor, such as under low speed, high load conditions, the engine crank shaft 1612 can supply rotational energy to the compressor 1608 via drive belt 1722, drive pulley 1718, shaft 1724, continuously variable transmission 1716 and transmission 1728. Again, any portion of the propulsion train can be used to supply rotational energy to the compressor 1608, and FIG. 17 discloses one implementation in accordance with one disclosed embodiment.

As also illustrated in FIG. 17, a cold start valve 1620 is also connected to the compressed air conduit 1704, which in turn is connected to the cold start conduit 1712. Cold start conduit 1712 is connected to the catalyzed diesel particulate filter inlet conduit 1714, which is upstream from the catalyzed diesel particulate filter 1616. The purpose of the cold start valve is to provide compressed intake air to the input of the catalyzed diesel particulate filter 1616 during startup conditions, as disclosed above. Under startup conditions, prior to the catalyzed diesel particulate filter 1616 reaching full operational temperatures, additional oxygen is provided via the cold start conduit 1712 to initiate the catalytic process. The additional oxygen that is provided via the cold start conduit 1712 assists in the initiation of the catalytic process. Controller 1640 controls cold start valve 1620 via controller cold start valve control signal 1644 in response to the engine speed signal 1626, engine load signal 1628, and the gas mixture temperature signal 1630.

Hence, the high efficiency, super-turbocharged engine 1600 operates in a manner similar to a super-turbocharger, with the exception that feedback valve 1618 supplies a portion of the compressed air from the compressor to the input of the turbine for two reasons. One reason is to cool the exhaust gases prior to entering the turbine so that the full energy of the exhaust gases can be utilized and a waste gate is not needed under high speed, high load conditions. The other reason is to provide a flow of air through the compressor to prevent surge at low rpm, high load conditions. In addition, the catalyzed diesel particulate filter can be connected in the exhaust stream before the exhaust gases reach the turbine so that the heat generated by the catalyzed diesel particulate filter 1616 can be used in driving the turbine 1606, and expanding the compressed intake air that is mixed with the hot gases from the catalyzed diesel particulate filter 1616, which greatly increases efficiency of the system. Further, the cold start valve 1620 can be used to initiate the catalytic process in the catalyzed diesel particulate filter 1616 by providing oxygen to the exhaust gases during startup conditions.

Hence, a unique super-turbocharger is disclosed that uses a high speed traction drive having a fixed ratio that reduces the rotational mechanical speed of the turbine/compressor shaft to an rpm level that can be used by a continuously variable transmission that couples energy between a propulsion train and the turbine/compressor shaft. A uniqueness of the super-turbocharger design is that the transmission is disposed within the system. The continuously variable transmission is disposed within a lower portion of the super-turbocharger housing. The continuously variable transmission 1116 provides the infinitely variable speed ratios that are needed to transfer rotational mechanical energy between the super-turbocharger and the engine. Either a geared continuously variable transmission can be used as continuously variable transmission 1116 or a traction drive continuously variable transmission can be used. Hence, traction drives can be used for both the high speed traction drive 114 and the continuously variable transmission 1116.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of facilitating exhaust gas recirculation in a super-turbocharged internal combustion engine comprising:
    providing a high pressure exhaust port of a first predetermined size in said internal combustion engine;
    providing a low pressure exhaust port of a second predetermined size in said internal combustion engine, said second predetermined size being larger than said first predetermined size;
    driving a high pressure super-turbocharger with a least a first portion of higher pressure exhaust gases from said high pressure exhaust port;
    providing at least a second portion of said higher pressure exhaust gases from said high pressure exhaust port to an intake manifold of said internal combustion engine;
    driving a low pressure super-turbocharger with lower pressure exhaust gases from said low pressure exhaust port;
    providing compressed air from an output of said low pressure super-turbocharger to an air input of said high pressure super-turbocharger;
    providing compressed air from an output of said high pressure super-turbocharger, at a predetermined pressure, to an intake manifold of said internal combustion engine;
    opening said high pressure exhaust port while a pressure in said high pressure exhaust port is greater than said predetermined pressure so that said second portion of said higher pressure exhaust gases recirculate through said internal combustion engine.

2. The method of facilitating exhaust gas recirculation in a super-turbocharged internal combustion engine of claim 1, further comprising:
    controlling said amount of said second portion of said higher pressure exhaust gases with respect to said first portion of said higher pressure exhaust gases using a valve disposed in a conduit that provides said second portion of said higher pressure exhaust gases to said intake manifold.

3. A method of facilitating exhaust gas recirculation in a super-turbocharged internal combustion engine comprising:
    providing a high pressure exhaust port of a first predetermined size in said internal combustion engine;
    providing a low pressure exhaust port of a second predetermined size in said internal combustion engine, said second predetermined size being larger than said first predetermined size;
    driving a high pressure turbine of a high pressure super-turbocharger with higher pressure exhaust gases from said high pressure exhaust port;
    driving a low pressure turbine of a low pressure super-turbocharger with lower pressure exhaust gases from said low pressure exhaust port;
    providing compressed air from an output of a low pressure compressor of said low pressure super-turbocharger to an air input of a high pressure compressor of said high pressure super-turbocharger;
    providing compressed air from an output of said high pressure compressor of said high pressure super-turbocharger, at a predetermined pressure, to an intake manifold of said internal combustion engine;
    providing exhaust gases from an output of said high pressure turbine to said intake manifold of said internal combustion engine;
    opening said high pressure exhaust port while pressure of said exhaust gases in said high pressure exhaust port is greater than said predetermined pressure so that said higher pressure exhaust gases from said output of said high pressure turbine recirculate through said internal combustion engine.

4. The method of facilitating exhaust gas recirculation in a super-turbocharged internal combustion engine of claim 3, further comprising:

providing a portion of said exhaust gases from said output of said high pressure turbine to said lower pressure exhaust gases to assist in driving said low pressure super-turbocharger.

5. The method of facilitating exhaust gas recirculation in a super-turbocharged internal combustion engine of claim 3, further comprising:
providing a portion of said higher pressure exhaust gases from said high pressure exhaust port to said intake manifold.

6. A method of facilitating exhaust gas recirculation in a super-turbocharged internal combustion engine comprising:
providing a high pressure exhaust port of a first predetermined size in said internal combustion engine;
providing a low pressure exhaust port of a second predetermined size in said internal combustion engine, said second predetermined size being larger than said first predetermined size;
providing higher pressure exhaust gases from said high pressure exhaust port to an intake manifold of said internal combustion engine;
driving a low pressure turbine of a low pressure super-turbocharger with lower pressure exhaust gases from said low pressure exhaust port;
providing compressed air from an output of a low pressure compressor of said low pressure super-turbocharger, at a predetermined pressure, to an intake manifold of said internal combustion engine;
opening said high pressure exhaust port while a pressure in said high pressure exhaust port is greater than said predetermined pressure so that said higher pressure exhaust gases recirculate through said internal combustion engine.

7. The method of facilitating exhaust gas recirculation in a super-turbocharged internal combustion engine of claim 6, further comprising:
providing a portion of said higher pressure exhaust gases to said lower pressure exhaust gases to assist in driving said low pressure super-turbocharger.

8. An exhaust gas recirculation system in a super-turbocharged internal combustion engine comprising:
a high pressure exhaust valve disposed in a first cylinder of said internal combustion engine, said high pressure exhaust valve having a first predetermined size, said high pressure exhaust valve controlling a flow of higher pressure exhaust gases in a high pressure exhaust port;
a low pressure exhaust valve disposed in said first cylinder of said internal combustion engine, said low pressure exhaust valve having a second predetermined size that is greater than said first predetermined size, said low pressure exhaust valve controlling a flow of lower pressure exhaust gases in a low pressure exhaust port;
a high pressure super-turbocharger having a high pressure compressor and a high pressure turbine that is driven by at least a first portion of said higher pressure exhaust gases in said high pressure exhaust port and produces compressed air at an output of said high pressure compressor;
a first conduit that provides at least a second portion of said higher pressure exhaust gases from said high pressure exhaust port to an intake manifold of said internal combustion engine;
a low pressure super-turbocharger having a low pressure compressor and a low pressure turbine that is driven by said lower pressure exhaust gases from said low pressure exhaust port;
a second conduit that provides compressed air from an output of said low pressure compressor to an air input of said high pressure compressor;
a third conduit that provides said compressed air from said output of said high pressure compressor, at a predetermined pressure, to said intake manifold of said internal combustion engine;
wherein said high pressure exhaust valve opens while pressure in said first cylinder of said internal combustion engine that flows to said higher pressure exhaust gases in said high pressure exhaust port is greater than said predetermined pressure of said compressed air from said output of said high pressure compressor so that said second portion of said higher pressure exhaust gases recirculate through said internal combustion engine, and said low pressure exhaust valve opens after said high pressure exhaust valve and during an exhaust stroke of said first cylinder.

9. The exhaust gas recirculation system in a super-turbocharged internal combustion engine of claim 8, further comprising:
a valve disposed in said first conduit that controls said amount of said second portion of said higher pressure exhaust gases with respect to said first portion of said higher pressure exhaust gases.

10. A system of facilitating exhaust gas recirculation in a super-turbocharged internal combustion engine comprising:
a high pressure exhaust valve disposed in a first cylinder of said internal combustion engine, said high pressure exhaust valve having a first predetermined size, said high pressure exhaust valve controlling a flow of higher pressure exhaust gases in a high pressure exhaust port;
a low pressure exhaust valve disposed in said first cylinder of said internal combustion engine, said low pressure exhaust valve having a second predetermined size that is greater than said first predetermined size, said low pressure exhaust valve controlling a flow of lower pressure exhaust gases in a low pressure exhaust port;
a high pressure super-turbocharger having a high pressure compressor and a high pressure turbine that is driven by said higher pressure exhaust gases from said high pressure exhaust port;
a low pressure super-turbocharger having a low pressure compressor and a low pressure turbine that is driven by said lower pressure exhaust gases from said low pressure exhaust port;
a first conduit that provides compressed air from said low pressure compressor of said low pressure super-turbocharger to an air input of said high pressure compressor of said high pressure super-turbocharger;
a second conduit that provides compressed air from an output of said high pressure compressor of said high pressure super-turbocharger, at a predetermined pressure, to an intake manifold of said internal combustion engine;
a third conduit that provides said higher pressure exhaust gases from an output of said high pressure turbine of said high pressure super-turbocharger to said intake manifold of said internal combustion engine;
wherein said high pressure exhaust valve is opened while a pressure in said first cylinder of said internal combustion engine that flows to said high pressure exhaust port is greater than said predetermined pressure so that said higher pressure exhaust gases from said output of said high pressure turbine of said high pressure super-turbocharger recirculate through said internal combustion engine, and said low pressure exhaust valve opens after said high pressure exhaust valve and during an exhaust stroke of said first cylinder.

11. The system of facilitating exhaust gas recirculation in a super-turbocharged internal combustion engine of claim 10, further comprising:
a fourth conduit having a first restriction that provides a portion of said higher pressure exhaust gases exiting said high pressure turbine of said high pressure super-turbocharger to said lower pressure exhaust gases to assist in driving said low pressure super-turbocharger.

12. The system of facilitating exhaust gas recirculation in a super-turbocharged internal combustion engine of claim 11, wherein said first restriction comprises:
a valve disposed in said fourth conduit that controls said portion of said higher pressure exhaust gases exiting from said high pressure turbine that is provided to said lower pressure exhaust gases.

13. The system of facilitating exhaust gas recirculation in a super-turbocharged internal combustion engine of claim 11, further comprising:
a fifth conduit having a second restriction that supplies a portion of said higher pressure exhaust gases supplied by said high pressure exhaust port to said third conduit.

14. The system of facilitating exhaust in a super-turbocharged internal combustion engine of claim 10, wherein said second restriction comprises:
a valve that controls said portion of said higher pressure exhaust gases supplied to said third conduit.

15. A system for facilitating exhaust gas recirculation in a super-turbocharged internal combustion engine comprising:
a high pressure exhaust port of a first predetermined size in said internal combustion engine;
a low pressure exhaust port of a second predetermined size in said internal combustion engine, said second predetermined size being larger than said first predetermined size;
higher pressure exhaust gases provided from said high pressure exhaust port to an intake manifold of said internal combustion engine;
lower pressure exhaust gases provided from said low pressure exhaust port;
a low pressure super-turbocharger having a low pressure compressor and a low pressure turbine that is driven by said lower pressure exhaust gases from said low pressure exhaust port;
compressed air provided from an output of said low pressure compressor of said low pressure super-turbocharger, at a predetermined pressure, to said intake manifold of said internal combustion engine;
wherein said high pressure exhaust port is opened while a pressure in said internal combustion engine feeding exhaust to said high pressure exhaust port is greater than said predetermined pressure of said compressed air provided from an output of said low pressure compressor so that at least a portion of said higher pressure exhaust gases recirculate through said internal combustion engine.

16. The system for facilitating exhaust gas recirculation in a super-turbocharged internal combustion engine of claim 15, further comprising:
a conduit that provides a portion of said higher pressure exhaust gases to said lower pressure exhaust gases to assist in driving said low pressure turbine.

17. The system for facilitating exhaust gas recirculation in a super-turbocharged internal combustion engine of claim 16, further comprising:
a valve disposed in said conduit that controls said portion of said higher pressure exhaust gases that is provided to said lower pressure exhaust gases to assist in driving said low pressure turbine.

\* \* \* \* \*